United States Patent
Dent et al.

(10) Patent No.: US 7,197,282 B2
(45) Date of Patent: Mar. 27, 2007

(54) MOBILE STATION LOOP-BACK SIGNAL PROCESSING

(75) Inventors: Paul W. Dent, Pittsboro, NC (US); Kambiz C. Zangi, Durham, NC (US); Leonid Krasny, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 691 days.

(21) Appl. No.: 10/135,095

(22) Filed: Apr. 30, 2002

(65) Prior Publication Data

US 2003/0036359 A1 Feb. 20, 2003

Related U.S. Application Data

(63) Continuation-in-part of application No. 09/945,002, filed on Aug. 31, 2001, and a continuation-in-part of application No. 09/915,895, filed on Jul. 26, 2001, and a continuation-in-part of application No. 09/915,896, filed on Jul. 26, 2001, and a continuation-in-part of application No. 09/939,006, filed on Aug. 24, 2001.

(51) Int. Cl.
    *H04B 17/00* (2006.01)

(52) U.S. Cl. .................. 455/67.14; 455/67.11; 455/68; 455/69; 455/63.1; 370/335; 370/329; 370/342; 370/336

(58) Field of Classification Search .......... 455/423, 455/422.1, 115.1, 456.1, 457, 226.1, 67.14, 455/67.11, 69, 68, 63.1, 67.13; 370/335, 370/329, 342, 336
See application file for complete search history.

(56) References Cited

U.S. PATENT DOCUMENTS 4,995,057 A    2/1991    Chung (Continued)

FOREIGN PATENT DOCUMENTS

EP    0936781    8/1999

(Continued)

OTHER PUBLICATIONS

Ying-Chang, Liang et al: "Transmit Antenna Array Techniques for Cellular CDMA System" Personal, Indoor and Mobile Radio Communications, 1998. The Ninth IEEE International Symposium on Boston, MA, USA, Sep. 8-11, 1998, New York, NY, USA <IEEE, US, Sep. 8, 1998, pp. 1396-1400, XP010314608 ISBN: 0-7803-4872-9.

(Continued)

*Primary Examiner*—Joseph Feild
*Assistant Examiner*—Khai Nguyen
(74) *Attorney, Agent, or Firm*—Coats & Bennett, P.L.L.C.

(57) ABSTRACT

Processing of loop-back information returned by one or more mobile stations that are served by a wireless communication network permits the network to compensate its transmit signals for increased transmission efficiency and reduced signal interference at the mobile stations. Generally, the network forms one or more transmit signals as a combination of different signals intended for the different mobile stations, and remembers transmit information associated with these transmit signals. The mobile stations return loop-back signals to the network, which determines transmit signal compensation information by comparing loop-back information to memorized information. The mobile stations may loop-back samples from composite received signals, from processed received signal samples, or loop-back estimates. In the first case, processing at the network involves compensating the combined transmit signals at the transmit modulation rate, while the second case involves symbol rate processing of the individual information streams intended for the different mobile stations.

42 Claims, 18 Drawing Sheets

U.S. PATENT DOCUMENTS

| | | | |
|---|---|---|---|
| 5,237,612 A | 8/1993 | Raith | |
| 5,481,572 A | 1/1996 | Skold et al. | |
| 5,499,272 A | 3/1996 | Bottomley | |
| 5,509,052 A | 4/1996 | Chia et al. | |
| 5,594,941 A | 1/1997 | Dent | |
| 5,619,503 A | 4/1997 | Dent | |
| 5,631,898 A | 5/1997 | Dent | |
| 5,642,358 A | 6/1997 | Dent | |
| 5,724,666 A | 3/1998 | Dent | |
| 5,790,596 A * | 8/1998 | Sexton | 375/228 |
| 5,812,935 A | 9/1998 | Kay | |
| 5,812,947 A | 9/1998 | Dent | |
| 5,845,199 A | 12/1998 | Longshore | |
| 5,848,060 A | 12/1998 | Dent | |
| 5,867,791 A | 2/1999 | Chambert | |
| 5,883,888 A | 3/1999 | St-Pierre | |
| 5,887,027 A | 3/1999 | Cohen et al. | |
| 5,909,460 A | 6/1999 | Dent | |
| 5,930,248 A | 7/1999 | Langlet et al. | |
| 5,940,741 A * | 8/1999 | Briancon et al. | 340/7.22 |
| 5,940,742 A | 8/1999 | Dent | |
| 5,953,637 A * | 9/1999 | Coons et al. | 455/11.1 |
| 5,963,874 A | 10/1999 | Mahler | |
| 5,991,282 A | 11/1999 | Langlet et al. | |
| 6,006,075 A | 12/1999 | Smith et al. | |
| 6,011,972 A * | 1/2000 | Kim | 455/446 |
| 6,067,324 A | 5/2000 | Harrison | |
| 6,081,566 A | 6/2000 | Molnar et al. | |
| 6,088,593 A | 7/2000 | Dent | |
| 6,104,933 A | 8/2000 | Frodigh et al. | |
| 6,144,711 A | 11/2000 | Raleigh et al. | |
| 6,181,739 B1 | 1/2001 | Ryde et al. | |
| 6,215,810 B1 * | 4/2001 | Park | 375/131 |
| 6,272,322 B1 * | 8/2001 | Su | 455/67.14 |
| 6,434,366 B1 | 8/2002 | Harrison et al. | |
| 6,438,374 B1 * | 8/2002 | Bhat | 455/423 |
| 6,473,467 B1 | 10/2002 | Wallace et al. | |
| 6,747,963 B1 * | 6/2004 | Park et al. | 370/335 |
| 6,763,225 B1 * | 7/2004 | Farmine et al. | 455/67.16 |
| 6,810,246 B1 * | 10/2004 | Kalofonos et al. | 455/423 |
| 2002/0036996 A1 * | 3/2002 | Ozluturk et al. | 370/335 |
| 2002/0037715 A1 * | 3/2002 | Mauney et al. | 455/421 |
| 2002/0039882 A1 * | 4/2002 | Ternullo et al. | 455/11.1 |
| 2004/0032836 A1 * | 2/2004 | Grill et al. | 370/252 |
| 2005/0018754 A1 * | 1/2005 | Song | 375/142 |

FOREIGN PATENT DOCUMENTS

| | | |
|---|---|---|
| EP | 1067710 | 1/2001 |
| EP | 1075122 | 2/2001 |
| EP | 1087545 | 3/2001 |
| EP | 1207645 | 5/2002 |
| WO | WO 9809381 | 3/1998 |
| WO | WO 98/37671 | 8/1998 |
| WO | WO 9921375 | 4/1999 |
| WO | WO 0135548 | 5/2001 |
| WO | WO 01/97474 | 12/2001 |
| WO | WO 0199453 | 12/2001 |

OTHER PUBLICATIONS

Kawakami E et al: "Multi-Stage Interference Canceller Systems With Accurate Radio Channel Estimation Under Fading Environment" 1997 IEEE 6th International Conference on Universal Personal Communication Record. San Diego, Oct. 12-16, 1997, IEEE International Conference on Universal Personal Communications, New York, IEEE, US, vol. 2 conf. 6, Oct. 12, 1997, pp. 475-479, XP010248754 ISBN: 0-7803-3777-8.

Thompson, J. S. et al: "Downlink transmit diversity schemes for CDMA networks" IIEE Proceedings: Communications, Institution of Electrical Engineers, GB, vol. 147 Ino. 6, Dec. 11, 2000, pp. 371-380, XP006013998 ISSN: 1350-2425.

Montalbano, G. et al: "Spatio-temporal array processing for matched filter bound Ioptimization in SDMA downlink transmission" Signals, Systems, and Electronics, 1998, ISSSE 98. 1998 URSI International Symposium on Pisa, Italy Sep. 29-Oct. 2, 1998, New York, NY, USA, IEEE, US, Sep. 29, 1998, pp. 416-421, XP010316826 ISBN: 0-7803-4900-8.

Initial Estimation of Communication Efficiency of Indoor Wireless Channels, G. J. Foschini and R. A. Valenzuela, Wireless Networks 3, pp. 141-154, 1997; Lucent Technologies, Bell Labs Innovations, Crawford Hill Laboratory, Holmdel, NJ 07733, USA.

On Limits of Wireless Communications in a Fading Environment When Using Multiple Antennas, G. J. Foschini and M.J. Gans, Wireless Personal Communications, vol. 6 (No.3), pp. 311-335, Kluwer Academic Publishers, Mar. 1998; Lucent Technologies, Bell Labs Innovations, Crawford Hill Laboratory—R137, 791 Holmdel-Keyport Road, Holmdel, NJ 07733-0400, USA.

* cited by examiner

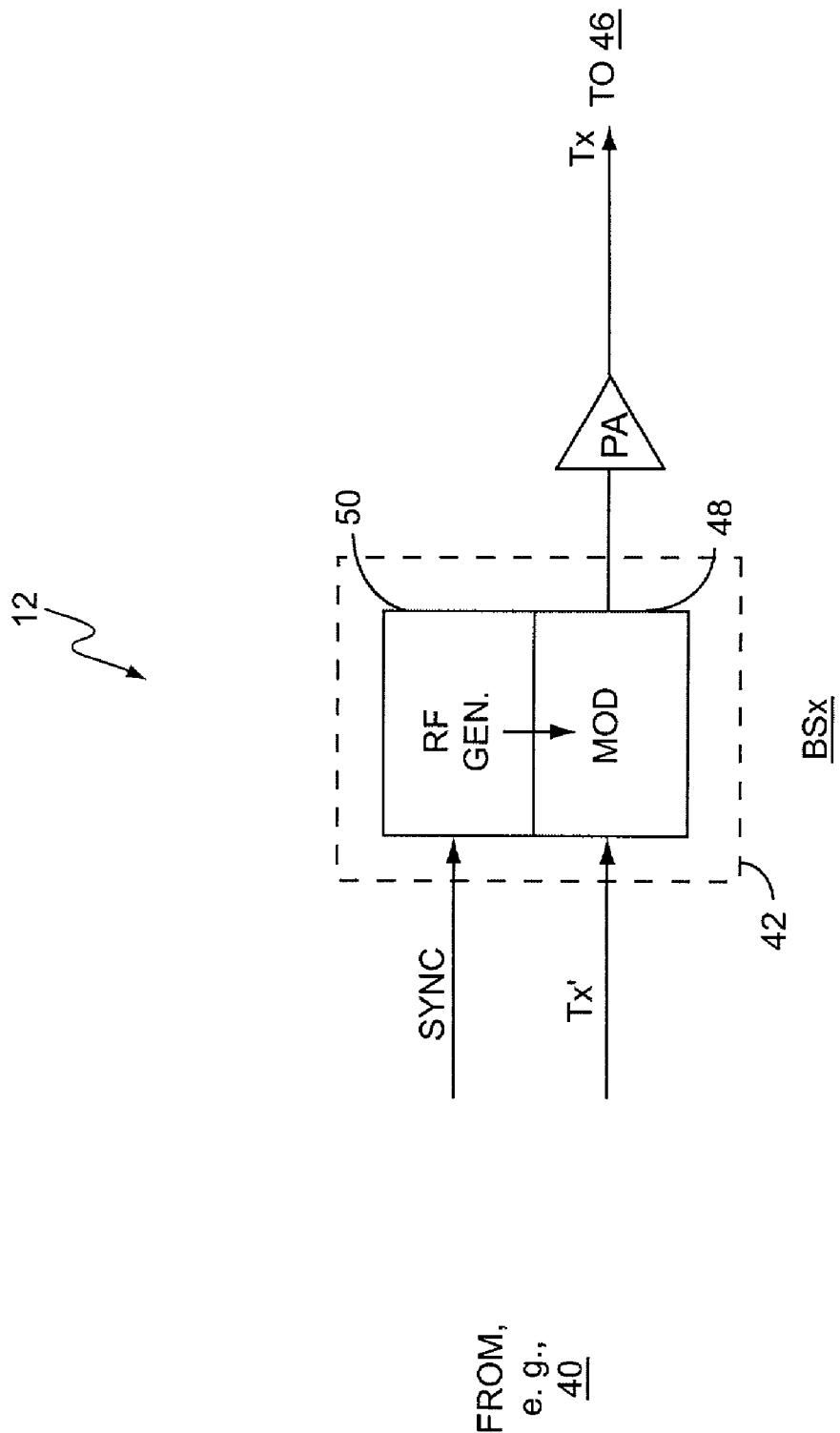

MOBILE STATION LOOP-BACK SIGNAL PROCESSING

RELATED APPLICATIONS

This application is a continuation-in-part of and claims priority under 35 U.S.C. § 120 from the following co-pending U.S. applications:

"Interference Cancellation in a CDMA Receiving System," application Ser. No. 09/945,002, filed Aug. 31, 2001;

"Communications System Employing Non-Polluting Pilot Codes," application Ser. No. 09/915,895, filed Jul. 26, 2001;

"Communication System Employing Transmit Macro-Diversity," application Ser. No. 09/915,896, filed Jul. 26, 2001; and "Communication System Employing Channel Estimation Loop-Back Signals," application Ser. No. 09/939,006, filed Aug. 24, 2001.

Further, this application explicitly incorporates by reference herein the disclosure in its entirety from each of the above-named applications.

BACKGROUND OF THE INVENTION

The present invention generally applies to wireless communication systems, and particularly applies to using receiver loop-back signals to improve communication system performance.

Wireless communication involves, in the most general sense, transmitting information from one location to another. A transmitter generates one or more transmit signals that is somehow varied, i.e., modulated, in accordance with desired transmit information. A receiver extracts the transmitted information from a received signal by detecting and decoding its signal modulations. In an ideal system, the originally transmitted signal modulations and, hence, the transmitted data, are perfectly preserved in the received signal.

Received signals seldom have perfect correspondence to transmitted signals because of downlink channel distortions. Propagation path characteristics of the radio medium include time-varying attenuation, phase shift, fading, and multipath reflections. Further variance between the transmit information and recovered received information arises from the non-ideal performance of transmitters and receivers. Signal transmission and reception involves signal filtering, amplification, and modulation, all of which may impart signal distortion.

Much of the business of robust wireless communication design involves detecting and correcting signal errors in an attempt to cope with the non-ideal realities of wireless signal transmission and reception. In a common approach, wireless receivers "learn" downlink channel characteristics and use the "learned" channel characteristics to compensate received signal distortions based on the estimated downlink channel. A common approach to downlink channel estimation involves the transmitter sending known information as part of the transmit signal. By looking at distortions in the known portion(s) of the received signal, the receiver develops estimates of the downlink channel, which it then uses to compensate the received signal. Because distortion changes rather rapidly in mobile environments, the typical mobile station receiver frequently updates its downlink channel estimates.

In a typical wireless communication network system, one or more network transmitters transmit signals to one or more mobile stations, which, in turn, transmit signals back to one or more network receivers. In such scenarios, the mobile stations commonly perform downlink channel estimation to compensate their respective received signals and, similarly, the network receiver(s) perform uplink channel estimation to compensate the signals received from the mobile stations. Thus, it is relatively common for a wireless receiver, whether at the mobile station or the network, to improve its reception performance by compensating its received signal using estimates of the channel through which the signal was received.

In a less common approach, a wireless transmitter pre-compensates its transmit signal for expected downlink channel distortions. That is, if the wireless transmitter has access to reasonably good estimates of the channel through which its transmitted signal will travel, it can alter the transmit signal in a manner that lessens the effects of transmit channel distortions on the signal received at the wireless receiver. Of course, one of the several challenges inherent in transmit signal pre-compensation is in obtaining downlink channel estimates. Obtaining such estimates can be challenging because the process generally involves obtaining loop-back information from the receiver(s) that actually receive the transmitted signal to which pre-compensation is applied.

BRIEF SUMMARY OF THE INVENTION

The present invention provides methods and apparatus for forming loop-back signals at mobile stations to be transmitted to the network, and for processing such loop-back signals at a wireless communication network to determine downlink channel characteristics. The network forms one or more combined transmit signals that include individual information signals for each of a plurality of mobile stations. Each mobile station receives a composite signal including information intended for the other mobile stations, and transmits a loop-back signal derived from the composite signal back to the network for processing. Through such processing, the network determines transmit channel compensation information, which it uses to pre-compensate the signals transmitted by the network to the mobile stations. In some embodiments, the mobile stations estimate downlink channels and convey such estimates as loop-back information to the network, which uses the received estimates for transmit pre-compensation.

Loop-back processing techniques in which the network estimates downlink channel characteristics based on analyzing loop-back signal samples from the mobile stations rely on the network storing or otherwise memorizing transmit signal information for the combined transmit signal or signals transmitted to the mobile stations. With such information, the network compares the loop-back information received from the mobile stations to corresponding memorized information to determine transmit channel characteristics, which may include selected transmit and receive processing, as well as the physical downlink channel. More particularly, loop-back signal processing at the network may include block-processing approaches wherein blocks of loop-back samples are correlated with memorized transmit signal information to obtain transmit channel characteristics. Other processing approaches rely on "continuous sequential least squares estimation" techniques, which may include, but are not limited to, Kalman Filtering, Least Squares Forever, and Exponential Filtering approaches. Such approaches themselves include various refinements, including the use of Kalman Trackers to track loop-back signal changes, wherein the effect of transmit signal dynamic encoding changes on loop-back signal characteristics are removed by pre-filtering the loop-back signals in advance of the Kalman Trackers using, for example, Kalman Filtering.

Other aspects of the present invention also permit significant variation. For example, transmit signal compensation may pre-compensate the combined transmit signals at the transmit modulation rate (transmit rate pre-compensation), or pre-compensate the individual information symbol streams intended for the different mobile stations at the information symbol rate (information rate pre-compensation), or combinations thereof. In the first case, the network memorizes the combined transmit signals transmitted by it to the mobile stations, while in the latter case it memorizes the individual information symbol streams intended for the different mobile stations. In either case, the mobile stations derive loop-back samples from the composite signal received by each mobile station.

Where the network uses transmit signal compensation, each mobile station loops back signal samples obtained from the composite signal received by that mobile station. Such loop-back information enables the network to determine the combining characteristics of its combined transmit signal or signals as received by the mobile stations through the downlink channel(s), and use these characteristics to pre-compensate, such as by pre-filtering, the combined transmit signal(s) at the network for the expected downlink channel characteristics.

Where the network uses symbol rate pre-compensation, each mobile station generally loops back processed signal samples derived from processing the composite signal received at that mobile station. For example, if the mobile stations use RAKE or GRAKE receivers, each mobile station might loop back "soft" output values obtained from the composite signal by its receiver. Regardless, one notable aspect of this approach is that, in contrast to the composite signal loop-back above, each mobile station loops back samples of its intended information signal separated from the received composite signal. With such loop-back information, the network can determine the relative interference between the individual information signals (i.e., individual symbol streams) intended for the different mobile stations, and can therefore pre-compensate the individual information streams at the network for such observed interference in advance of forming the combined transmit signals.

As a further alternative to the approach immediately above, the mobile stations may loop back composite received signal samples, and the network may derive the processed output values that would be output at each mobile station, e.g., the soft output values. That is, the network might model the composite received signal processing employed by the mobile stations to predict the values being extracted from the composite received signal by each mobile station. With this technique, the mobile stations feed back composite received signal samples, which simplifies in some respects loop-back signal generation at the mobile stations, yet the network applies transmit pre-compensation to the individual information symbol streams using symbol rate processing.

The ability to derive processed samples representative of the processed sample values being generated at each mobile station further enables the network to combine pre-compensation of its combined transmit symbols with pre-compensation of the individual information symbol streams from which the combined transmit symbols are formed. That is, the network can efficiently combine transmit rate and symbol rate pre-compensation. Such combined transmit pre-compensation enables the network to simultaneously increase transmission efficiency and reduce interference at the mobile stations. Transmit efficiency may be improved by tailoring combined transmit signal powers through adjustment of the combining weights used to form the combined transmit signals, while interference at the mobile stations may be reduced by compensating the information symbol streams for inter-signal interference as experienced at the mobile stations.

With its many variations, the present invention is adaptable for use in essentially any type of wireless communication network. For example, where the network uses Time Division Multiple Access (TDMA) techniques, the network might employ a plurality of transmit antennas for transmitting combined transmit signals to one or more mobile stations. In such circumstances, transmit pre-compensation might involve the use of a transmit pre-filter having filter coefficients that determine the weighted combinations used to form the combined transmit signals, and wherein loop-back processing operates to adjust such transmit pre-filtering based on the determined transmit channel characteristics.

Where the network uses Code Division Multiple Access (CDMA) techniques, the network might transmit a single combined signal from a single transmit antenna to a plurality of mobile terminals. In this case, the network might use processed sample loop-back information to determine undesirable cross-correlations between the individual information signals intended for the different mobile stations. With determination of such cross-correlation estimates, the network can, as noted earlier, compensate the individual information symbol streams for the estimated cross-correlation.

In general, the network uses estimated transmit channel characteristics to pre-compensate it transmit signal(s) for the expected effects of the transmit channel. Such pre-compensation involves, in the various exemplary embodiments, pre-compensation of the individual information signals intended for the different mobile stations based on cross-correlation compensation of those signal streams, and/or pre-compensation of the combined information streams used to form the combined transmit signal(s). These techniques reduce unwanted signal interference at the mobile stations and improve network transmission efficiency. Of course, other advantages and features of the present invention will be apparent to those skilled in the art upon reading the following detailed description, and upon viewing the exemplary associated diagrams, in which like reference numbers refer to like or similar elements.

BRIEF DESCRIPTION OF THE DRAWINGS

FIG. 6 is a diagram of an exemplary base station transmitter.

DETAILED DESCRIPTION OF THE INVENTION

Figure 1:
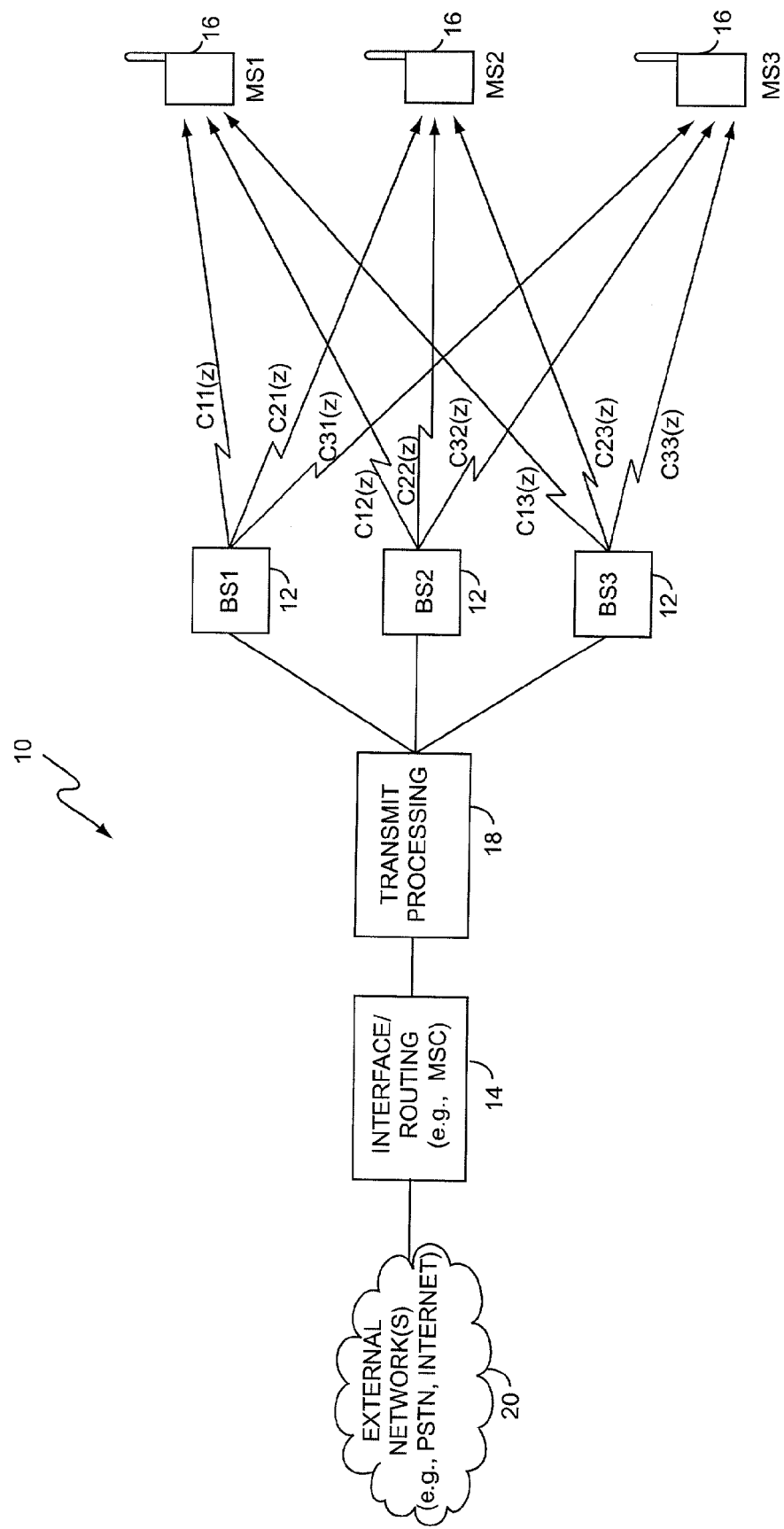
FIG. 1 is a diagram of an exemplary wireless communication network according to one embodiment of the present invention.

The present invention is directly applicable to a wide variety of wireless communication network types, such as those based on TDMA schemes, and those based on CDMA schemes. Exemplary standards to which the present invention applies include, but are not limited to, the TIA/EIA/IS-136, TIA/EIA/IS-95, and TIA/EIA/IS-2000 (cdma2000) published by the Telecommunications Industry (TIA) Association and the Electronics Industry Association (EIA), and Wideband CDMA (WCDMA). Those skilled in the art will further recognize the present invention's applicability to variants of one or more of these standards, such as the IS-856 High Data Rate (HDR) variant associated with IS-2000, and the somewhat similar high-data variants of WCDMA. Of course, the direct applicability of the present invention carries forward from these standards into the evolving fourth-generation wireless standards, and beyond. In light of this broad applicability, the following discussion includes sections that pertain to techniques for TDMA, CDMA, or both.

As a starting point, the present invention involves a fixed network of stations transmitting information using one or more antennas to one or more outstations (e.g., remote receivers) such as mobile stations. Where multiple transmitting network antennas are used, the mobile stations receive overlapping transmitted signals from the multiple network antennas. The mobile stations transmit signals back to the network stations from which the network stations can determine characteristics of the downlink propagation channels from each network transmitting antenna to each mobile station. Using the determined characteristics, the network stations then precondition the transmitted signals for each network transmitting antenna to enhance network transmissions. Such enhancements might include, but are not limited to, improvements in network transmission efficiency, and improvements in signal quality at the mobile stations.

In at least some exemplary embodiments of the present invention, each mobile station receives a network-transmitted signal in an allocated channel bandwidth and samples the received signal. The received signal samples are then combined with signal samples originating at the mobile station and the combined sample stream is then converted to a continuous signal using transmit filters, up-converted and transmitted from the mobile station back to the network. This loop-back signal from the mobile station to the network allows the network to determine downlink channel characteristics, as seen by the mobile station.

More particularly, in at least some exemplary embodiments, the network stations of the preferred implementation receive, possibly using multiple antennas, the signals transmitted by the mobile stations and process these received signals to determine characteristics of the uplink propagation paths from the mobile station transmitters to the network receivers. The determined uplink propagation channel characteristics are then employed in correlating loop-back signals with the signals transmitted by the network antennas to determine characteristics of the downlink propagation paths from the network's transmitting antennas to the mobile stations. The network then uses the determined downlink propagation path characteristics to condition the signals transmitted from the network antennas to the mobile stations to, for example, maximize transmission efficiency and received signal quality.

FIG. 1 illustrates an exemplary wireless communication network generally referred to by the numeral 10. Network 10 is generally like the wireless networks presented in the previously incorporated parent applications, and it should be understood that presentation of network 10 is simplified for clarity. Network 10 might include considerably more sophistication in actual implementation, and a number of network entities that might be included in an actual wireless network are not shown. However, such complexities are not germane to understanding the present invention. Here, network 10 comprises one or more base stations (BSs) 12 that, in combination with an interface/control entity 14, provide wireless communication support to a plurality of mobile stations (MSs) 16. The network 10 further includes a transmit processing system 18, which might be a distributed system, to provide pre-compensation processing for the signals transmitted by the network to the MSs 16.

The interface/control entity 14 provides traffic routing and overall control, such as call setup, etc., for the BSs 12, and interfaces the network 10 to one or more external networks 20, such as the Public Switched Telephone Network (PSTN) and the Internet. Thus, the interface/control entity 14 might be, for example, a Mobile Switching Center (MSC), a packet-based gateway router, such as a Packet Data Serving Node (PDSN), or a mixture of such entities. In any case, those skilled in the art will appreciate that the present invention applies to both circuit-switched and packet-switched network arrangements, and to combinations thereof.

Figure 2:
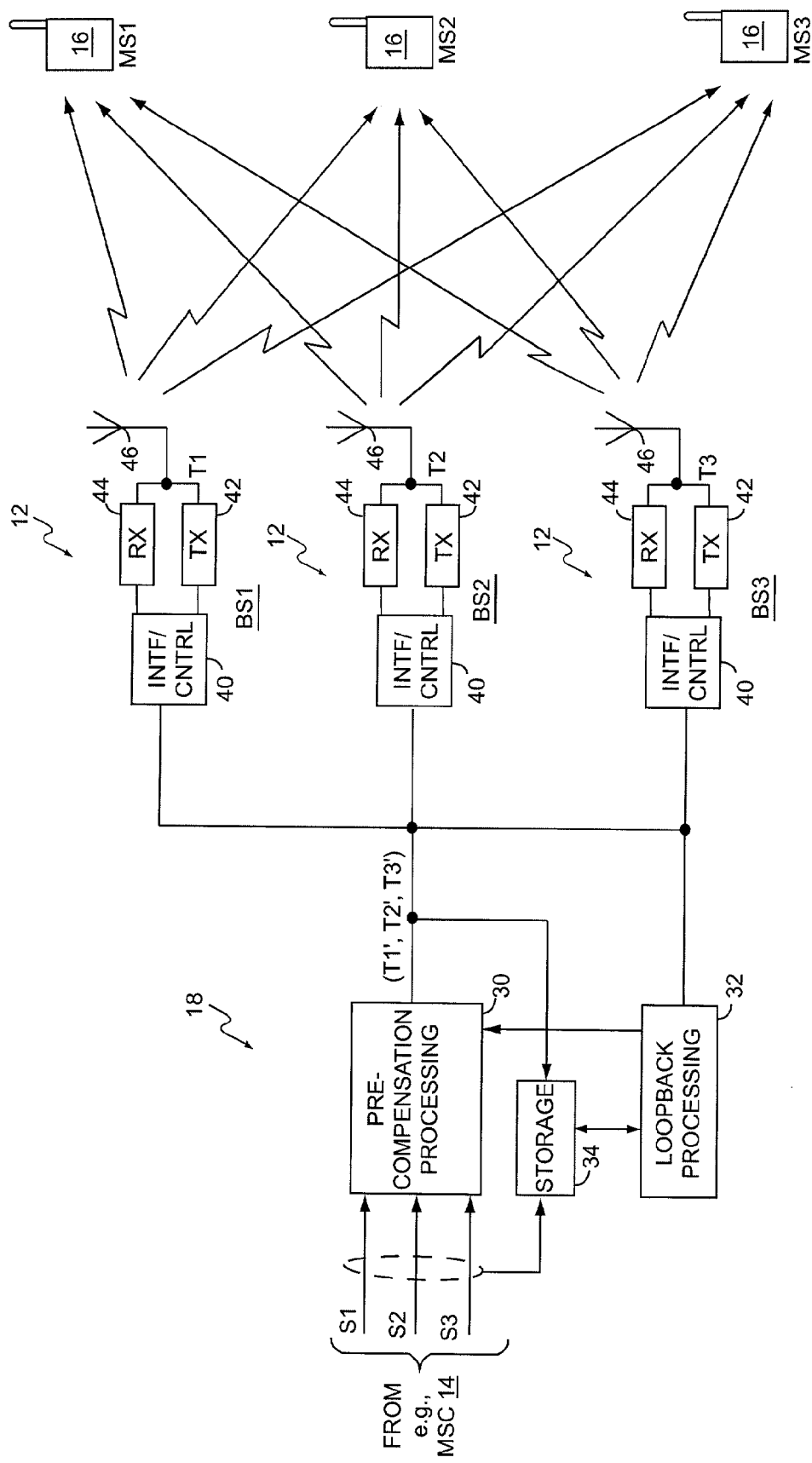
FIG. 2 is a diagram of exemplary transmit pre-compensation processing functions.

FIG. 2 illustrates an exemplary embodiment of network 10. Here, transmit processing system 18 comprises pre-compensation processor 30, loop-back processor 32, and supporting memory 34. Memory 34 comprises, in exemplary embodiments, one or more memory devices and/or storage systems, and may include, but is not limited to, solid-state memories, magnetic memory such as disk drives, or combinations thereof.

BSs 12 each comprise, in at least some exemplary embodiments, an interface/control processor 40, radio transmitters 42, radio receivers 44, and one or more antennas 46. Note that for the purposes of this discussion, a single BS 12 might represent a set of receiver/transmitter radio resources supporting one or more sectors of network 10 and operating under control of an MSC, for example. Alternatively, each BS 12 might represent a Base Station System (BSS), including a Base Station Controller (BSC) with an associated plurality of Radio Base Stations (RBSs) or Base Transceiver Systems (BTSs). In any case, one or more BSs 12 can be used to provide multiple transmission sites for the associated network 10. Note that in some embodiments of the present invention, a given BS 12 operates as a single transmission site transmitting a single, combined transmit signal to a plurality of MSs 16, while in other embodiments, it transmits one or more combined transmit signals from two or more relatively closely spaced transmission antennas or antenna elements.

Generally, each BS 12 serves as a network transmitter with one or more transmitting antennas when used in practicing loop-back as disclosed in the parent applications. Each receiver (i.e., MS 16) receives signals from the network antennas 46 in an assigned frequency channel, converts the signals to representative samples, combines locally generated samples such as pilot code samples to the received samples, then converts the combined samples to a transmit signal for transmission back to the network 10 as a loop-back signal. The loop-back signal transmitted back to the network 10 from each MS 16 comprises the looped-back received signal and the locally generated signal samples, the latter being useful to the network 10 to separate out the uplink propagation path characteristics. Herein, various methods of signal combining at the MSs 16 are disclosed that can be advantageous in different circumstances.

In operation, the network 10 generates combined pre-transmit signals T1', T2', and T3', based on forming a combination of information symbol streams S1, S2, and S3, each containing desired information for a corresponding one of the MSs 16 (i.e., MS1, MS2, and MS3). Transmit processing system 18 transfers the combined pre-transmit symbols to respective ones of the BSs 12, such that a first base station 12 transmits combined transmit signal T1, a second base station 12 transmits combined transmit signal T2, and a third BS 12 transmits combined transmit signal T3, T1, T2, and T3 are formed at the respective BSs 12 based on, for example, modulating a carrier signal at the desired transmit frequency with the combined symbol information contained in the pre-transmit signals T1', T2', and T3'.

Figure 3:
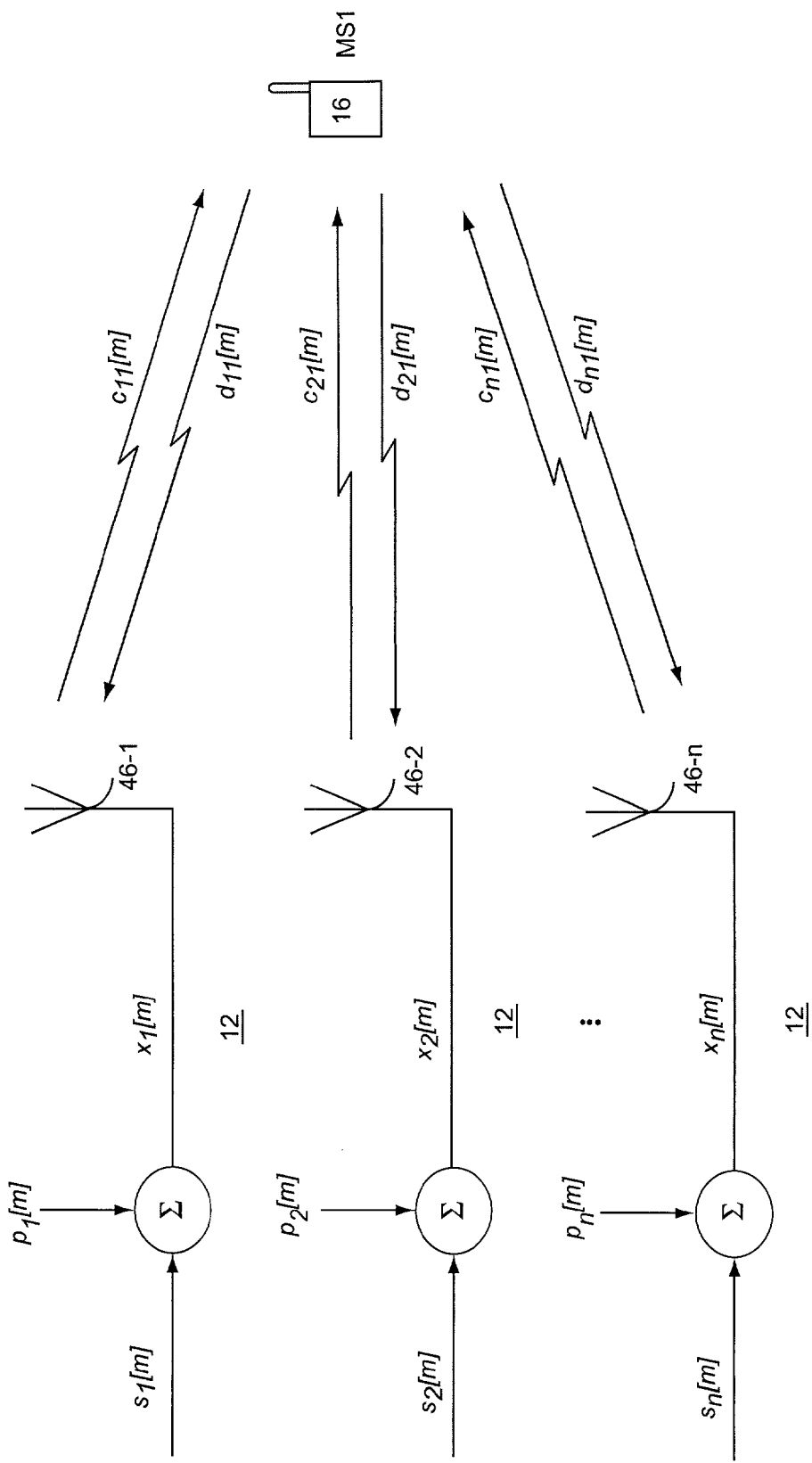
FIG. 3 is a functional block diagram of network transmissions to a mobile station according to an exemplary embodiment of the present invention.

The present invention permits a variety of approaches in terms of processing loop-back signals for determining characteristics of the transmit channel between the network 10 and the various MSs 16. An exemplary method is illustrated for one MS 16 with the understanding that the same method can be used for determining the downlink channels to any other mobile station. FIG. 3 depicts the network 10 as it relates to the determination of downlink channels between multiple network transmit antennas 46-1 through 46-n, which may be co-located at a single network transmission site, e.g., positioned at a single BS 12, and a first receiver, e.g., a given MS 16. In FIG. 3, $x_i[m]$ is a complex baseband signal transmitted by the i-th transmit antenna, e.g., 46-i, and is output by the i-th summer as the sum of two signals: (1) the information signal $s_i[m]$; and (2) a pilot signal $p_i[m]$. The signal $s_i[m]$ is a data-bearing signal transmitted from the i-th network transmit, and $p_i[m]$ is a pre-determined signal that generally carries no data but is useful in aiding network-determination of loop-back information.

Figure 4:
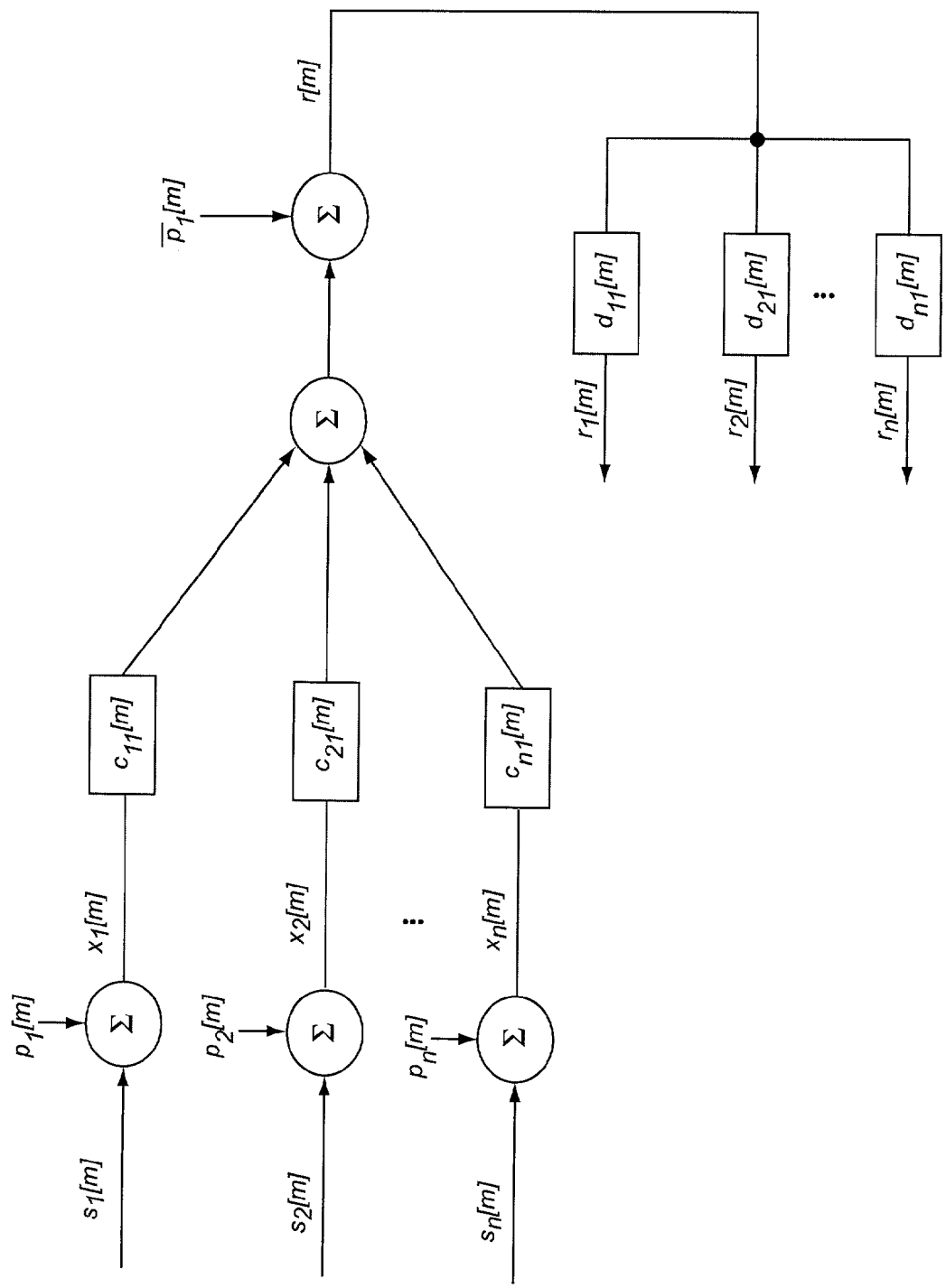
FIG. 4 is a more detailed functional block diagram of the network transmission arrangement of FIG. 3.

FIG. 4 illustrates a more detailed block diagram. Here, $c_{i1}[m]$ is the downlink channel from the i-th network transmit antenna to the first MS 16, and $d_{i1}[m]$ is the uplink channel from the first MS 16 to the i-th network receive antenna, which may be the same as network transmit antenna 46-i, or co-located therewith. The signal $\bar{p}_1[m]$ is a pilot signal being transmitted on the uplink channel by MS 16, and this pilot signal is known to the network 10.

From the perspective of network 10, the goal is to determine the downlink channel characteristics $\{c_{11}[m], \ldots, c_{n1}[m]\}$ based on:

(a) the signals $\{r_1[m], \ldots, r_n[m]\}$ received at the network 10;

(b) the network's known transmitted signals $\{x_1[m], \ldots, x_n[m]\}$; and (c) the pilot signals $\bar{p}_1[m]$ transmitted by the MSs 16.

Using the commutative property of linear time invariant systems, the time ordering of FIG. 4 may be, for purposes of analysis, re-imagined in a reverse order where the uplink channels are positioned in advance of the downlink channels. Thus, in FIG. 5, $v_i[m] = \bar{p}_1[m] * d_{i1}[m]$, which indicates that the intermediate signal, $v_i[m]$, results from convolving the known MS-generated pilot signals, $\bar{p}_1[m]$, with the downlink channels, $d_{i1}[m]$. A proposed exemplary method for determining the downlink channels at the network 10 is as follows:

1. Using the known uplink pilot signal, $\bar{p}_1[m]$, the network 10 jointly estimates all the uplink channels $\{d_{11}[m], \ldots, d_{n1}[m]\}$ from the received signals $\{r_1[m], \ldots, r_n[m]\}$. A variety of estimation techniques may be used for this purpose, as are well understood by those skilled in the art.

2. The network 10 forms an estimate of the intermediate signals $\{\bar{s}_1[m], \ldots, \bar{s}_n[m]\}$ shown in FIG. 5. The estimate for $\bar{s}_n[m]$ is simply the convolution of $x_i[m]$, which is known to network 10, with the estimate of uplink channel $d_{i1}[m]$ obtained in Step (1) above.

3. Lastly, network 10 jointly estimates the downlink channels $\{c_{11}[m], \ldots, c_{n1}[m]\}$, i.e., estimates one or more downlink channel parameters, using the estimates of the intermediate signals, $\{\bar{s}_1[m], \ldots, \bar{s}_n[m]\}$ and the uplink received signals $\{r_1[m], \ldots, r_n[m]\}$. In this estimation, $\{\bar{s}_1[m], \ldots, \bar{s}_n[m]\}$ serve as a set of known pilot signals. That is, given $\{\bar{s}_1[m], \ldots, \bar{s}_n[m]\}$, the signals $\{r_1[m], \ldots, r_n[m]\}$ received at network 10 are a linear function of the downlink channel taps $\{c_{11}[m], \ldots, c_{n1}[m]\}$, and a variety of well-known estimation techniques can be used for jointly estimating the downlink channel characteristics $\{c_{11}[m], \ldots, c_{n1}[m]\}$ from $\{r_1[m], \ldots, r_n[m]\}$.

An exemplary embodiment for Step (3) above is presented here. Let $\vec{v}_i$ be a vector of N consecutive samples of $v_i[m]$, and $\vec{r}_i$ to be a vector of N consecutive samples of $r_i[m]$, and thus express $\vec{r}_i$ as, $$\vec{r}_i = A_{i1} x \underbrace{\begin{bmatrix} \vec{c}_{11} \\ \vec{c}_{21} \\ \vdots \\ \vec{c}_{n1} \end{bmatrix}}_{\vec{c}_1} + (\vec{v}_i + \vec{w}_i), \quad 1 \le i \le n \qquad (1)$$

where $\vec{c}_{i1}$ is a vector of non-zero taps of $c_{i1}[m]$, $\vec{w}_i$ is a vector representing all other sources of interference and noise at the i-th network receive antenna, and $A_{i1}$ is a convolution matrix whose entries only depend on $\{\bar{s}_{1i}[m], \bar{s}_{2i}[m], \ldots, \bar{s}_{ni}[m]\}$. The signals received from all the network receive antennas, e.g., all the receive antennas at BS 12, may be expressed as a function of all of the downlink channels as follows, $$\underbrace{\begin{bmatrix} \vec{r}_1 \\ \vec{r}_2 \\ \vdots \\ \vec{r}_n \end{bmatrix}}_{\vec{r}} = \underbrace{\begin{bmatrix} A_{11} \\ A_{21} \\ \vdots \\ A_{nl} \end{bmatrix}}_{B_1} \times \underbrace{\begin{bmatrix} \vec{c}_{11} \\ \vec{c}_{21} \\ \vdots \\ \vec{c}_{nl} \end{bmatrix}}_{\vec{c}_1} + \begin{bmatrix} \vec{v}_1 + \vec{w}_1 \\ \vec{v}_2 + \vec{w}_2 \\ \vdots \\ \vec{v}_n + \vec{w}_n \end{bmatrix} \quad (2)$$

An estimate of vector $\vec{c}_1$ can be obtained as $\vec{c}_1^{estimate} = (B_1^H B_1)^{-1} B_1^H \vec{r}$, where $B_1^H$ is the Hermitian of matrix $B_1$.

The quality of the above estimate depends on the properties of $(B_1^H B_1)$, which should be as close as possible to a scaled diagonal matrix. To this end, one would like each $x_i[m]$ to be as uncorrelated as possible with the other $x_j[m]$'s transmitted by network 10, and would further like each $x_i[m]$ to have deterministic auto-correlation as close as possible to a delta function. The worst estimation performance arises when the $(B_1^H B_1)$ matrix is singular, i.e. in this case even with no noise at all, the downlink channels cannot be uniquely determined by the network 10. The pilot signals, $\{p_1[m], \ldots, p_n[m]\}$, are added by network 10 to its transmissions to ensure that $(B_1^H B_1)$ does not become singular, and to make $(B_1^H B_1)$ as close as possible to a scalar identity matrix.

Figure 5:
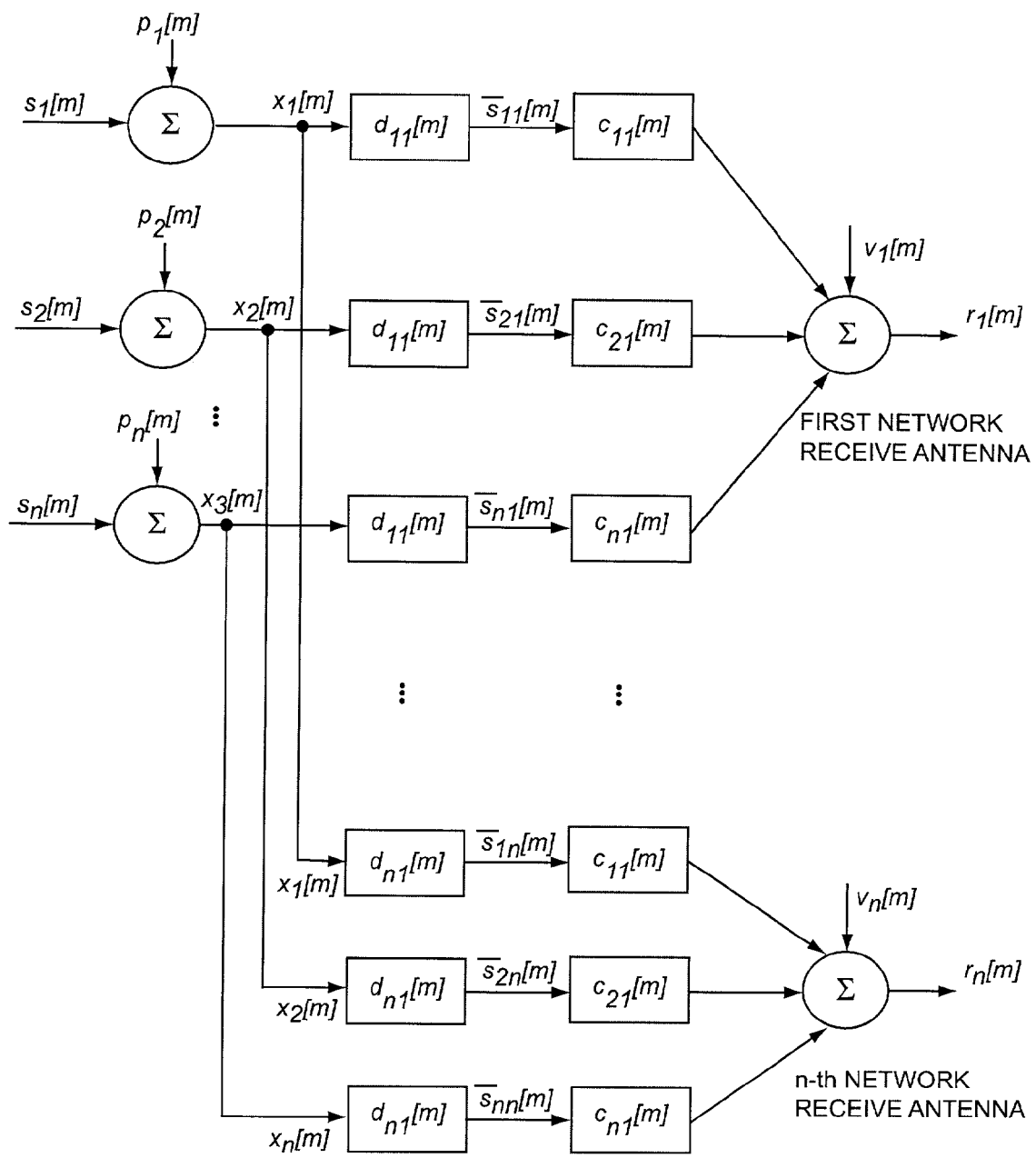
FIG. 5 is a functional block diagram illustrating exemplary network reception and processing of the loop-back signals generated in the illustrations of FIGS. 3 and 4.

As a generalization to the above approach, and with reference to FIG. 5 in the context of the first MS 16 (MS1), one sees that the $\{s_i[m]\}_{i=1}^n$ signals, which may be combined transmit signals including individual information signal streams for one or more MSs 16, are respectively combined with corresponding ones of the network's pilot signals $\{p_i[m]\}_{i=1}^n$ to form the $\{x_i[m]\}_{i=1}^n$ signals. Passing the $\{x_i[m]\}_{i=1}^n$ signals through the corresponding estimated uplink channels generates the intermediate signals $\{\bar{s}_{in}[m]\}_{i=1}^n$. Since these intermediate signals are, at this point, known to the network 10, and the received signals $\{r^i[m]\}_{i=1}^n$ (for n network antennas) are known, the network 10 can determine the downlink channel estimates $\{\hat{c}_{11}[m], \ldots, \hat{c}_{n1}[m]\}$ by treating the downlink channel(s) as a linear time-invariant channel with $n^2$ inputs and n outputs. That is, the known inputs are $\{\bar{s}_{11}[m], \ldots, \bar{s}_{n1}[m]; \ldots; \bar{s}_{1n}[m], \ldots, \bar{s}_{nn}[m]\}$, and the known outputs (the received feedback signals) are $\{r_1[m], \ldots, r_n[m]\}$.

Turning to the exemplary network transmitter details for BSs 12 that appear in FIG. 6, a modulator 48 modulates an RF carrier signal provided by RF generator 50 responsive to one of the combined transmit signals T1', T2', and so on, generically represented as combined transmit signal Tx'. The combined transmit signals may be, as detailed above, formed by summing one or more individual information signals intended for a specific MS 16, or selected ones in a group of MSs 16, along with a known pilot signal.

Note that carrier generation at each of the network transmit sites can be synchronized by using, for example, a synchronization signal generated by network 10. For example, transmit processing system 18 can generate a synchronization signal (or signals) for maintaining synchronization between the BSs 12, such that the combined transmit signals are transmitted with the desired synchronization.

In any case, each MS 16 receives a composite signal representing a combination of the transmissions from each one of the BSs 12. The particular manner in which the transmit signals combine at each MS 16 depends on the downlink propagation characteristics between that MS 16 and the respective ones of the BSs 12. Each MS 16 transmits a loop-back signal to the network 10, which the network 10, via loop-back processor 32, processes to determine downlink channel characteristics, such that the network's transmissions to the MSs 16 may be pre-compensated for expected downlink channel distortions.

In various embodiments of the present invention, MSs 16 form the loop-back signals to include samples from the received composite signal, or using processed samples obtained from the MS's receiver. In the first instance, looped back composite signal samples generally are used by the network 10 to perform transmit rate pre-compensation, while the processed samples looped back from the MSs 16 generally are used to perform symbol rate pre-compensation. Distinctions between these two pre-compensation approaches are discussed in more detail later.

Regardless, the overall operation of network 10 with regard to loop-back signal processing is such that downlink propagation information is obtained by comparing loop-back information obtained from the loop-back signals with corresponding transmit information, after removal of the uplink propagation effects from the loop-back signals. That is, information in the loop-back signals representative of the network's own transmissions is processed to remove the effects of uplink propagation, such that comparing that information with original transmit information reveals the effects of downlink propagation.

Thus, network 10 stores, at least temporarily, transmit signal information in memory 34 for use by loop-back processor 32. Of course, a variety of comparison-type processing is available, including correlation of loop-back symbol information with the corresponding information symbol information in previously transmitted portions of the information symbol streams S1, S2, and S3. Comparison processing might, particularly where composite signal information is looped back, be based on the combined transmit signals (e.g., T1', T2', and so on), in which case, the combined transmit signals are saved to memory 34 as the transmit information used by loop-back processor 32.

Figure 7A:
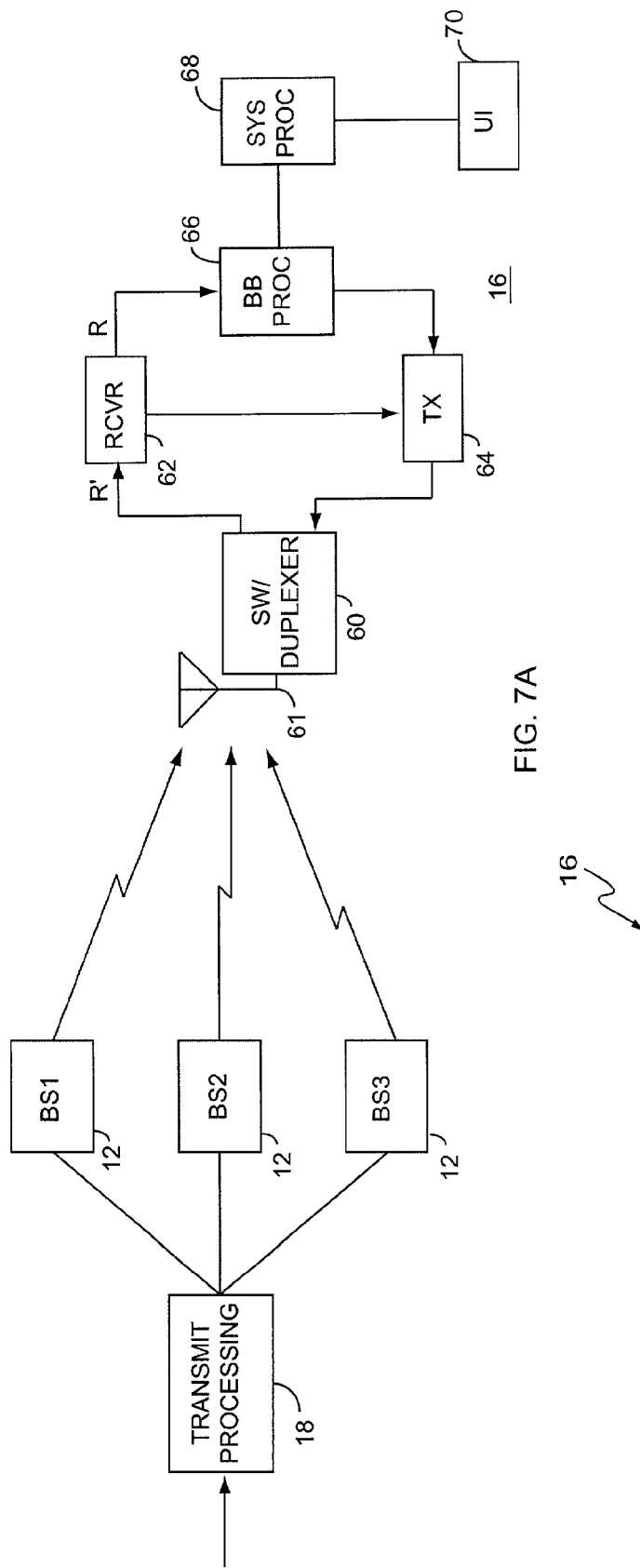
FIG. 7A is a diagram of an exemplary mobile station receiving combined transmit signals.

FIG. 7A illustrates exemplary details for MSs 16. The exemplary MS 16 comprises a switch/duplexer 60 coupling a receiver 62 and transmitter 64 to an antenna assembly 61, a baseband processor 66, a system processor 68, and a user interface 70. User Interface 70 typically comprises a keypad, display screen, and audio input/output systems (not shown), while system processor 68 provides overall control of the MS 16, and often provides specific control of User Interface 70. Baseband processor 66 generally provides signal processing functions for received signal processing and transmit signal generation.

Figure 7B:
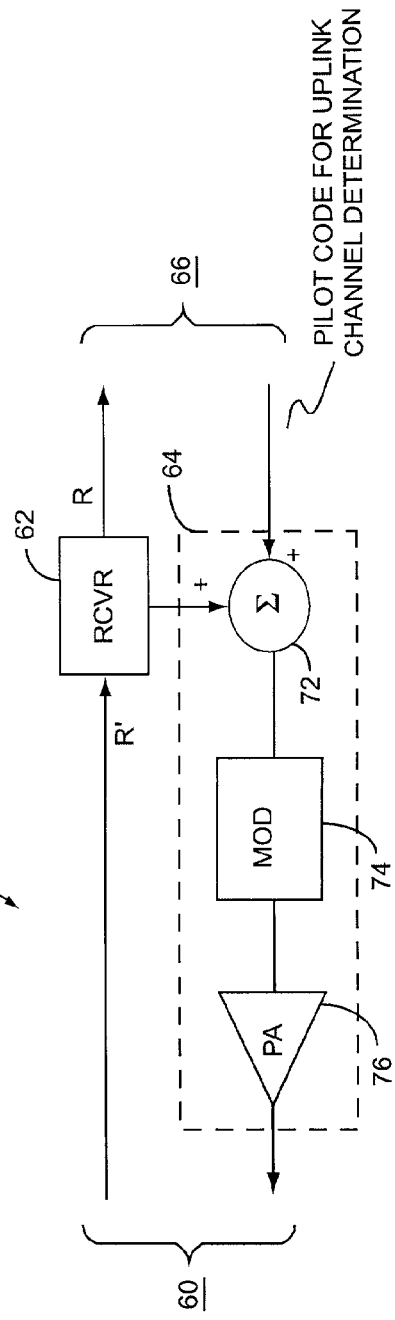
FIG. 7B is a diagram of an exemplary mobile station transmitter providing loop-back.

FIG. 7B illustrates additional transmitter details, and depicts an exemplary transmitter 64 as comprising a summing circuit 72, a modulator 74, and a power amplifier (PA) 76. In some embodiments, the receiver 62 couples samples of the composite received signal back to the transmitter 64 via the summing circuit 72. Of course, those skilled in the art will appreciate the opportunity for significant variations in MS architecture, and will thus recognize these details as simply representing one possible approach to loop-back signal generation.

In any case, the summing circuit 72 may be used to combine signal samples looped back from the receiver 62 with pilot code information. That is, the MS 16 generates its loop-back signal as a combination of its received signal information and known pilot information. In this manner, the network 10 can more easily identify uplink channel affects by examining distortions in the received pilot information, since that information is known to the network 10 and was transmitted only through the uplink channel.

Figure 8:
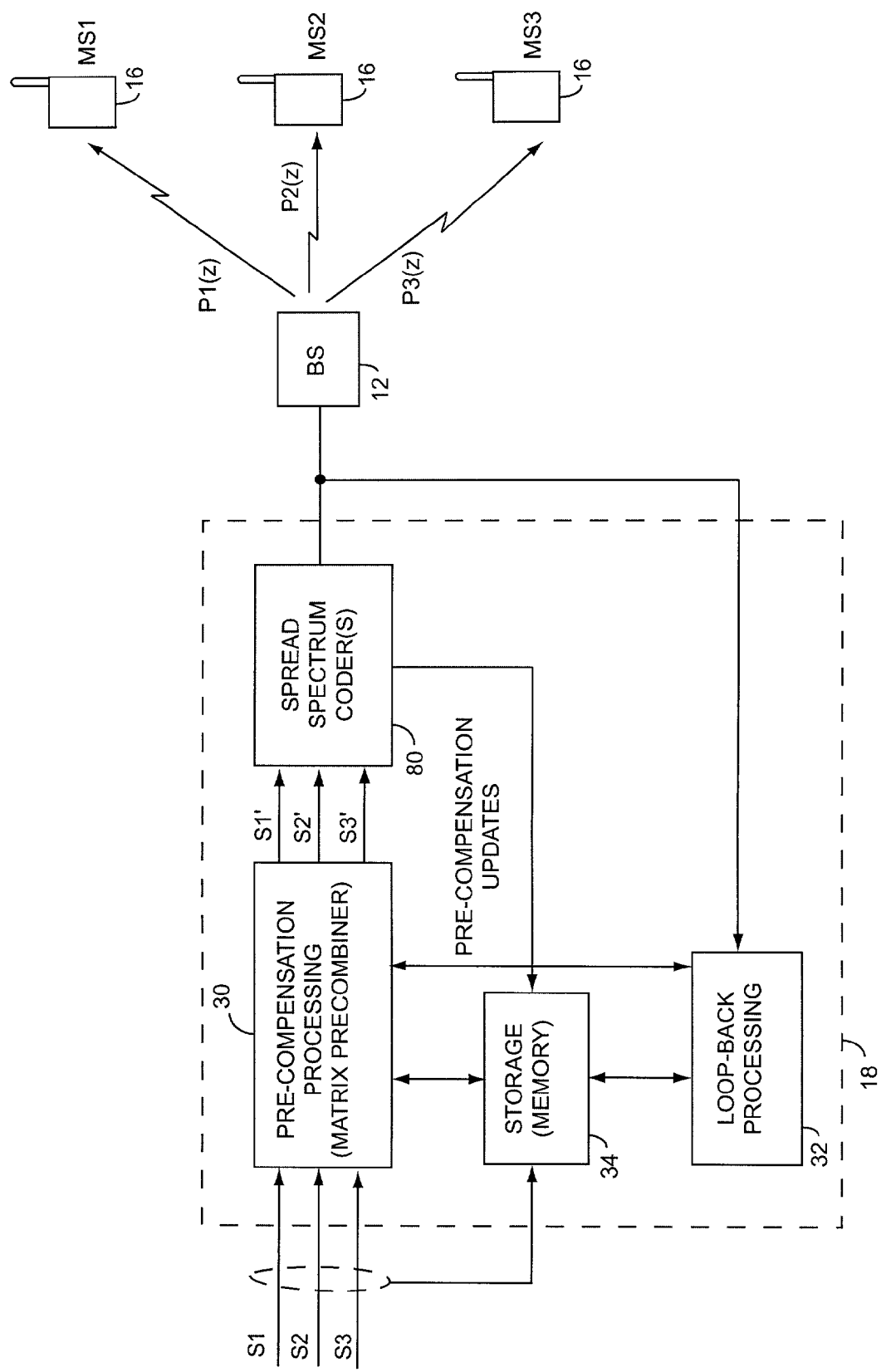
FIG. 8 is a diagram of exemplary transmit pre-compensation functions for CDMA-type transmissions.

Whereas the foregoing illustrations depicted multiple network antennas, FIG. 8 illustrates an exemplary embodiment of the present invention in which a single antenna, represented as a single BS 12, transmits pre-compensated signals to a plurality of MSs 16. Here, the transmit processing system 18 comprises a "matrix pre-combiner" as pre-compensation processor 30, and includes loop-back processor 32 and memory 34 as before, as well as a spread spectrum coder 80.

Pre-compensation processor 30 pre-compensates individual information symbol streams, S1, S2, and S3, for expected cross-correlation interference using symbol rate processing, based on knowledge of the CDMA spreading codes used in coder 80 and on the determined downlink channel characteristics, to minimize interference between signals destined for different receivers. That is, spread spectrum coder 80 encodes the pre-compensated symbol streams, S1', S2', and S3' for CDMA transmission. In generating the pre-compensated symbol streams, pre-compensation processor 30 compensating the corresponding input symbol streams, S1, S2, and S3, for cross-correlation interference determined from the loop-back signals from MS1, MS2, and MS3 by loop-back processor 32.

Such pre-compensation involves, in some embodiments of the present invention, determining a cross-correlation matrix between wanted and unwanted signals at each MS 16 based on processing loop-back information from the MSs 16. With this information, loop-back processor 32 determines coefficients for a cross-correlation compensation matrix by which the individual information streams S1, S2, and S3 are multiplied such that the signals received by each MS 16 combine in a manner that tends to reduce wanted and unwanted signal cross-correlation.

Figure 9:
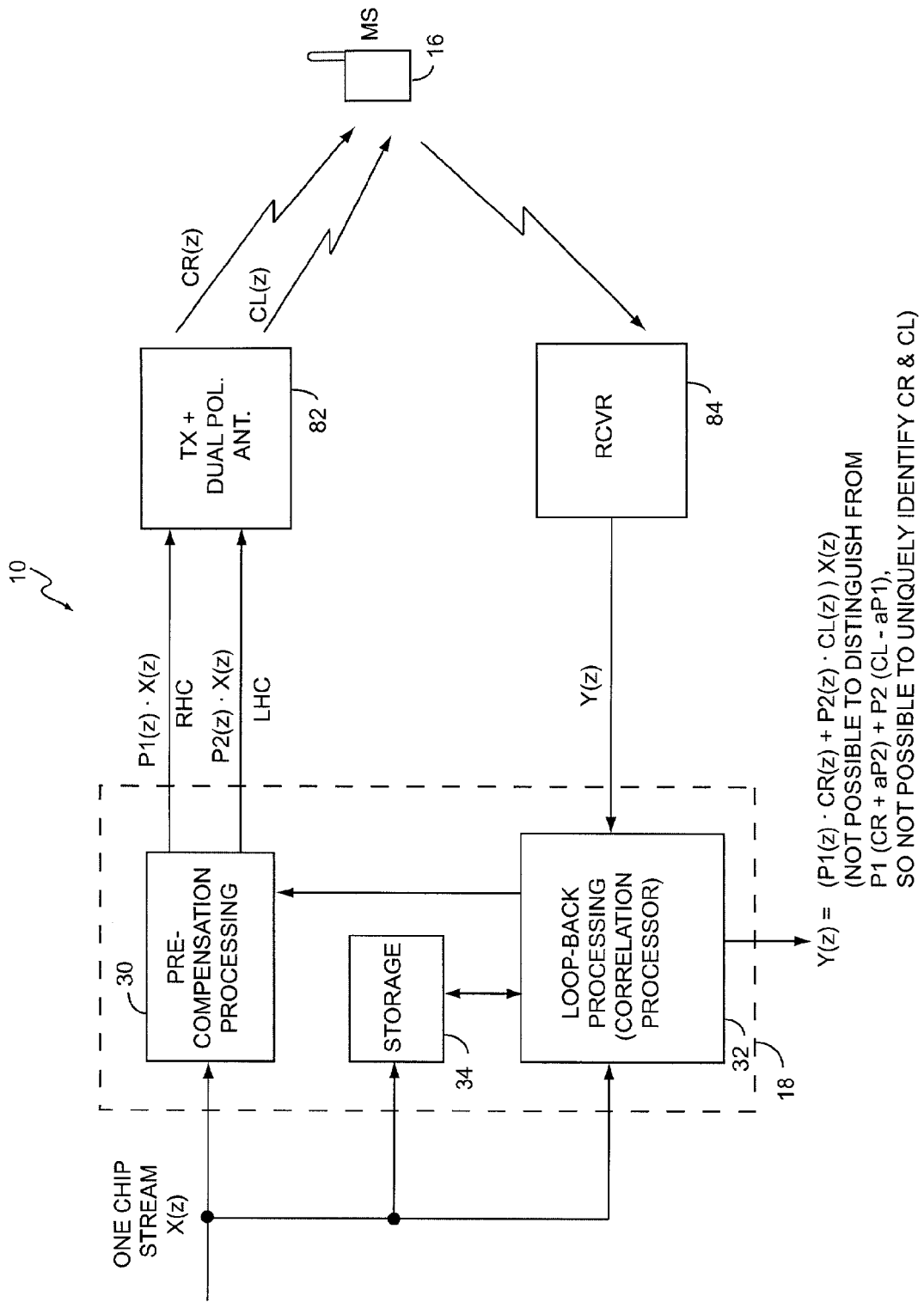
FIG. 9 is a diagram of exemplary transmit pre-compensation using network transmitters with differently polarized antennas.

FIG. 9 illustrates yet another application, in which dual polarized network antennas are co-located at a network transmitter 82. As an example, the two antennas might comprise orthogonally polarized antennas. In an exemplary embodiment, information for the MSs 16 is preconditioned for transmission by the two antennas using transmit rate processing (e.g., chiprate processing) to optimize transmission to each MS 16 independently.

Network 10 generally requires, in both FIGS. 8 and 9, downlink channel information to optimize transmissions to the MSs 16. FIG. 9 illustrates the presence of an informational deficiency when determining two downlink channels from only one loop-back signal, which however was solved in the parent applications by transmitting at least one "dummy" pilot signal as well as the information bearing signals.

Figure 10A:
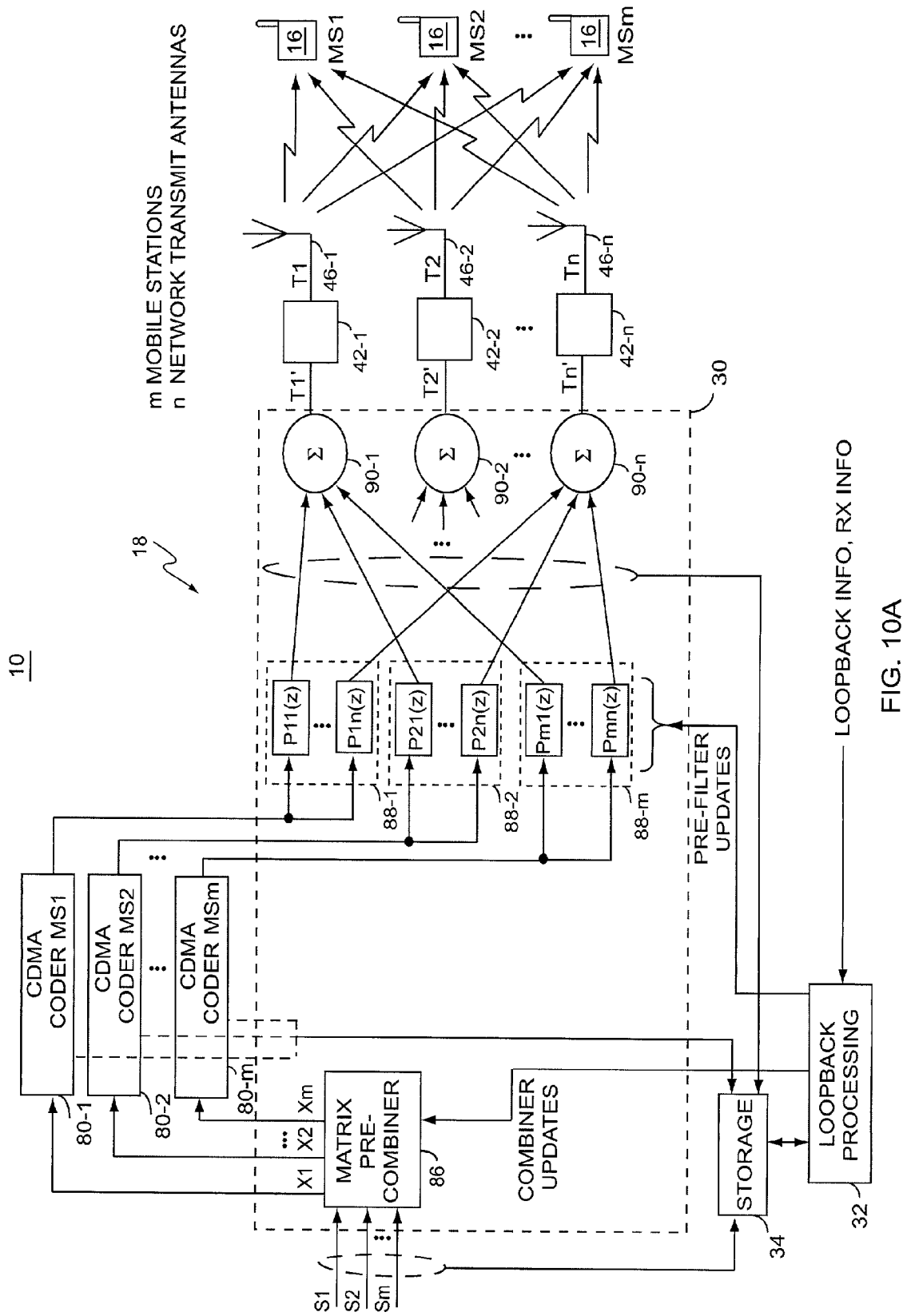
FIG. 10A is a diagram of exemplary transmit pre-compensation combining symbol rate and transmit rate pre-compensation.

FIG. 10A depicts network 10 as a combination of the approaches illustrated in FIGS. 8 and 9, in which transmissions to the MSs 16 are optimized using both transmit rate processing to increase transmission efficiency, and symbol rate processing to pre-cancel interference between information symbols intended for different MSs 16. The illustration depicts a scenario where the network 10 transmits "n" combined transmit signals to "m" MSs 16. Here, network 10 comprises transmit processing system 18, CMDA coders 80, network transmitters 42 and corresponding network antennas 46. Note that transmitters 42 might comprise the transmitter portion of BSs 12, as shown in earlier embodiments.

Transmit processing system 18 comprises, in this embodiment, matrix pre-combiner 86, pre-filters 88, and summing circuits 90. In operation, pre-combiner 86 receives individual information symbol streams S1, S2, . . . Sm, corresponding to the desired information for each of the MSs 16, e.g., MS1, MS2, . . . , MSm. Pre-combiner 86 compensates these individual symbol streams for expected downlink cross-correlation interference based on cross-correlation estimates generated by loop-back processor 32, which determines such estimates based on loop-back information obtained from the loop-back signals from the MSs 16.

In more detail, symbol streams S1, S2, . . . Sm for transmission to respective MSs MS1, MS2, . . . MSm enter pre-combiner 86, which forms linear combinations of the symbol streams based on the total downlink channel characteristics and correlations between the spreading codes used in CDMA coders 80-1, 80-2, . . . 80-$m$, comprised of codes 1, 2, . . . m. The symbols may be bits or higher order symbols such as complex 8 Phase Shift Keying (PSK) constellation points. The total downlink channel in this context means the channel describing propagation from the output of coder(i) (which is input to the pre-filters 88 of first index i) to the receiver output of the j-th MS 16, which may be the output of a RAKE combiner. Thus, the downlink channel includes the pre-filters 88 after the CDMA coders 80, and thus comprises a "net" downlink channel inclusive of the diversity effect of using up to 'n' antennas 46 for transmitting to each MS 16.

The linear combinations of symbols S1 to Sm are denoted by X1 to Xm and represent multi-level values that are not necessarily equal to symbol constellation values. These Xi values are generated at the symbol rate and multiplied by corresponding spreading code(i) to form a chip-rate stream. Thus, in this context, transmit rate processing denotes processing performed at the spreading chip rate on the linear combinations of the individual information symbol streams, while symbol rate processing denotes the cross-correlation pre-compensation performed at the underlying information symbol rate.

However, in cases where all spreading is the result of intelligent error-correction coding prior to the formation of symbol streams S1 to Sm, the symbol streams are already equal to the final chip-rate and the CDMA coders 80 merely perform a 1:1 symbol-wise scrambling that does not further increase the chip rate. On the other hand, in many CDMA systems the error correction coding prior to the formation of symbols S1 to Sm is a small factor in the total spreading, and the final spreading from symbol rate to chip rate performed by coders 1 to m is by a large factor.

The chip-rate streams of complex numbers from coders 80-1 to 80-m are transmitted using any or all of antennas 46-1 to 46-$n$, after pre-filtering by pre-filters 88-1 to 88-$m$, in such a way as to maximize transmission efficiency. In general, more power should be transmitted from the antenna 46 having the lowest path loss to a target MS 16, and this characteristic is achieved by practicing the teachings of the parent applications. In particular, the pre-filter Pij(z) for conditioning the signals from coder 88-i for antennas 46-1 to 46-$n$ can be equal to the time-reverse conjugate transpose of the matrix Cji(z) describing the downlink propagation channels from antenna j to receiver i, where each Cji is a z-polynomial for a multipath channel.

In addition, the total power transmitted for each MS 16 may be scaled by an overall power control factor to maintain a desired signal level at the MSs 16 to combat noise and interference other than the interference cancelled by pre-combiner 86. The target desired signal level may be signaled from each receiver (i.e., MS 16) to the network 10 by a signal quality feedback channel, or else may be deduced by the network from the loop-back signals returned from each receiver, wherein the noise and un-cancelled interference levels will be evident.

Figure 10B:
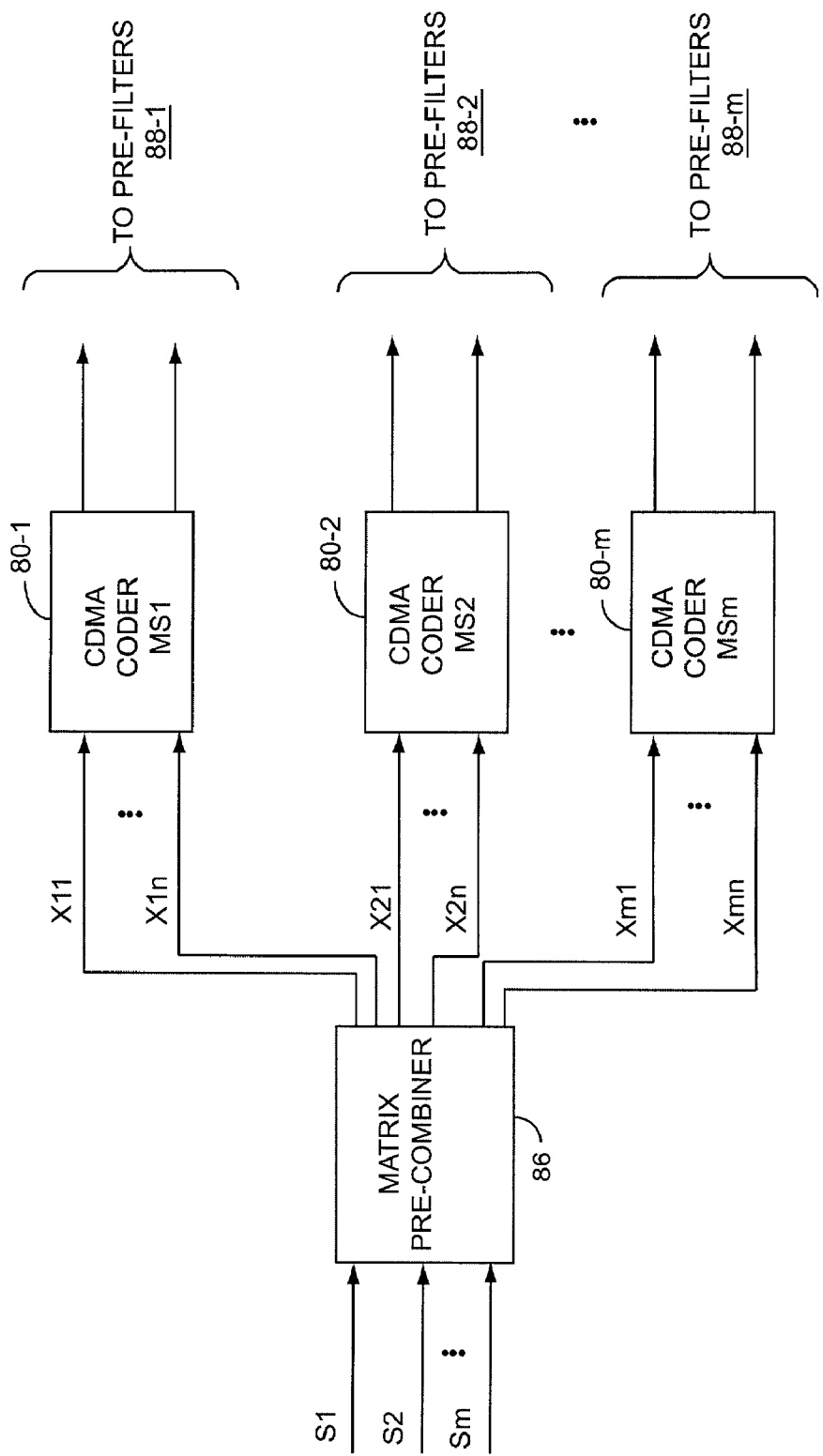
FIG. 10B is a diagram of an exemplary alternate embodiment for combined transmit pre-compensation.

FIG. 10B shows a slightly more general form for the arrangement illustrated in FIG. 10A. In this embodiment, the inputs to all the chip-rate pre-filters Pij(z) associated with transmission to the same MS 16 are identical. The symbol-rate pre-combining produces different symbol combinations for each antenna 46, as disclosed in the parent applications for non-CDMA systems. In the parent applications, pre-combinations to be transmitted by the same antenna 46 were added. However, in this embodiment, the pre-combinations are first spread using respective CDMA coders 80 to obtain CDMA coded spread-spectrum signals to be transmitted from each antenna 46, which are then also subjected to separate chip-rate pre-filtering via pre-filters 88 prior to addition by summing circuits 90.

The network 10 illustrated in FIG. 10B can perform the function of FIG. 10A by making the precombiner outputs Xij the same for all j=1 to n, and so FIG. 10A is a special case of FIG. 10B, with FIG. 10B being a more general form while still using independent chip-rate pre-filters as opposed to cross-coupled (matrix) pre-filtering at the chip rate. In both FIGS. 10A and 10B, however, symbol rate processing cancels mutual interference between the transmissions included in the network's joint transmission scheme. That is, symbol rate pre-compensation reduces interference between the signals intended for the different MSs 16 that are included in the combined transmit signals from network 10. On the other hand, transmit rate processing, here embodied as chip-rate pre-filtering, optimizes or otherwise improves the signal-to-noise plus interference ratio (SNIR) due to interference from other transmissions not included in the network's transmit scheme. As with the other approaches to transmit signal pre-compensation, the combined optimization of both symbol-rate and chip-rate pre-compensation filtering requires knowledge of the downlink propagation channels, which may be provided by loop-back signals from the MSs 16.

Figure 11:
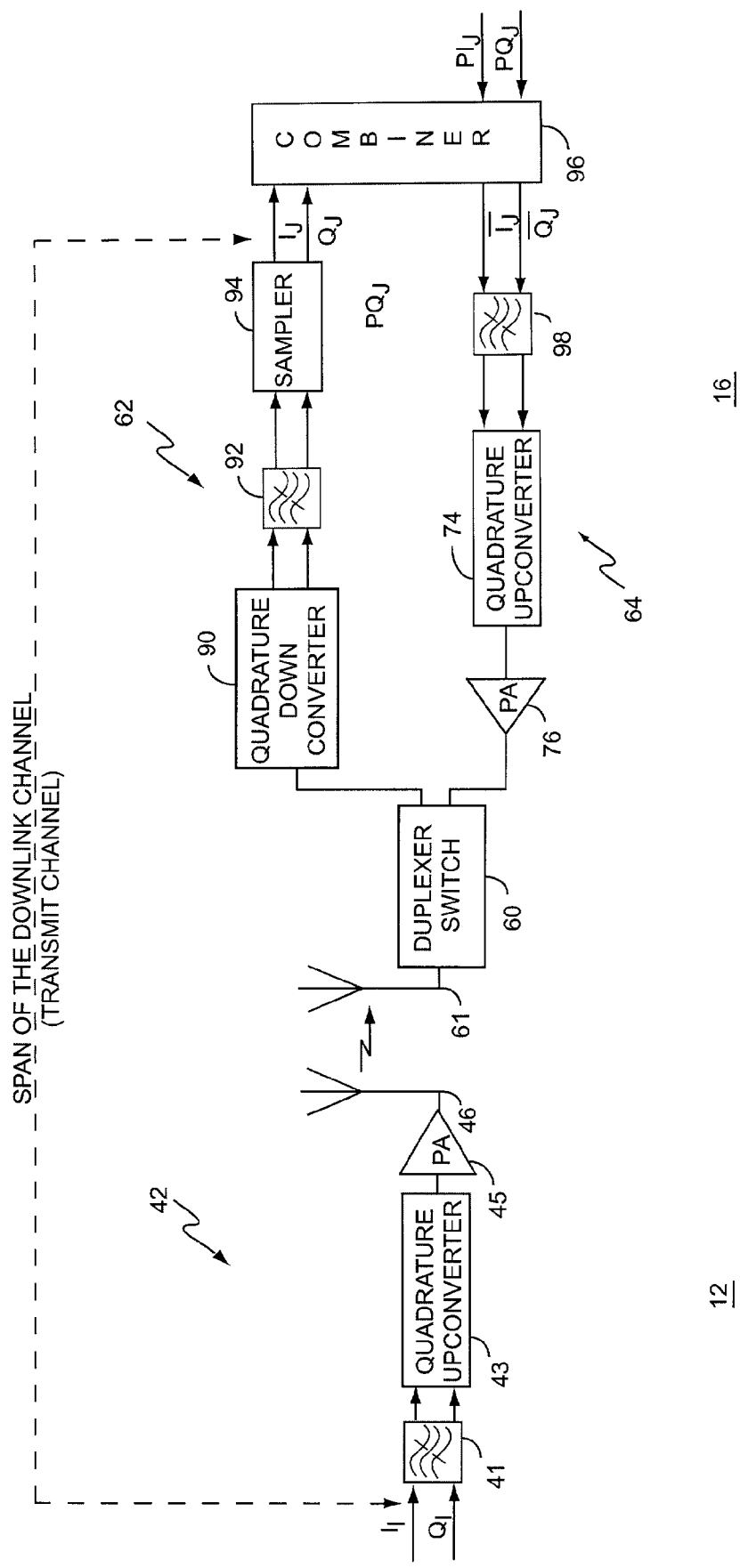
FIG. 11 is a diagram of an exemplary downlink channel span.

FIG. 11 illustrates an exemplary downlink channel span. While the downlink channel in this context obviously includes the physical medium between the network 10 and the MSs 16, it further includes at least a portion of the transmission and reception systems in the network transmitters and MS receivers, respectively. Thus, transmit signal pre-compensation may be used to compensate not only for the physical channel propagation characteristics, but for the characteristics of the transmitting and receiving systems as well. Hence, the downlink channel might be more comprehensively referred to as the "transmit channel."

In this exemplary embodiment, the transmitter 42 in a given network BS 12 comprises an input filter 41, an upconverter/modulator 43, a PA 45, and antenna 46. For quadrature signaling schemes, the input filter 41 filters the I and Q signal samples received from, for example, the transmit processing system 18. After filtering, these signals drive the modulator 43, which outputs the modulated RF carrier signal to the PA 45, which amplifies it to a level suitable for transmission by antenna 46. Of course, the BS 12 might include a plurality of transmitter resources for simultaneously generating multiple transmit signals. Thus, it should be understood that FIG. 11 represents a simplification in at least some respects.

The signal transmitted from BS 12 is received by a given one of the MSs 16, which, here, comprises antenna 61, switch/duplexer 60, receiver 62, transmitter 64 and combiner 96, which might comprise a portion of the baseband processor 66 shown earlier. Receiver 62 comprises down-converter 91, filter 92, and sampler 94. Together, these elements receive, filter, downconvert, and digitize the received signal to produce a baseband sample stream of I and Q signal samples ($I_j$, $Q_j$). Transmitter 64 comprises filter 98, upconverter (modulator) 74, and PA 76. Together, the transmitter elements generate a transmit signal for transmission by antenna 61. As noted throughout, signal transmitted from MS 16 generally includes loop-back information for determination of downlink channel characteristics by the network 10.

The span of the downlink channel—transmit channel—is illustrated as spanning from the $I_I$, $Q_I$ sample inputs of the transmit filter 41 at BS 12 to the $I_j$, $Q_j$ sample outputs from sample 94 at the MS 16. The span of the uplink channel from MS 16 to network 10 is defined similarly as being from the input of samples $\overline{I_J}$, $\overline{Q_J}$ to the MS transmitter filter 98 to the output the network equivalent of receiver sampler 94. If, at the MS 16, received samples from sampler 94 are connected directly into transmit filter 98, the loop-back channel defined from network 10 to the MS 16 and back is simply the product of the downlink and uplink channels defined above.

Figure 12A:
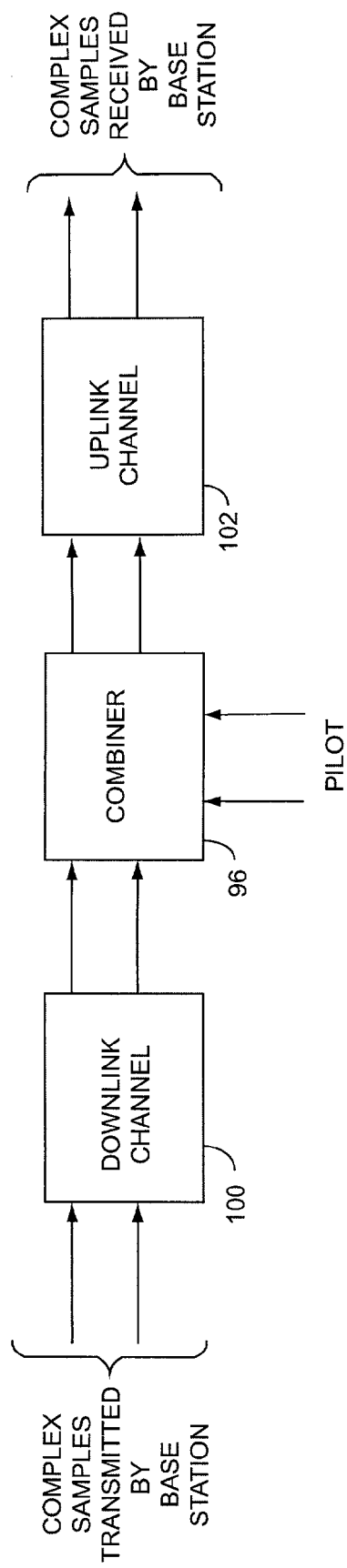
FIG. 12A is a diagram of the overall downlink/uplink (loop-back channel).

FIG. 12A illustrates the various downlink and uplink channel combinations involved for the various loop-back signal components at a given one of the MSs 16. First, the complex samples transmitted by the network 10 pass through the downlink channel 100 as described above, where they are received by the MS 16. Combiner 96 in the MS 16 combines the signal received from the network 10 with locally generated pilot signal information, which combined information is then returned by the MS 16 to the network 10 via transmission through the uplink channel 102. Thus, the network 10 receives complex samples including a component comprising loop-back sample data that has passed through both the downlink channel 100 and the uplink channel 102, and pilot signal sample data that has passed through only the uplink channel 102.

Figure 12B:
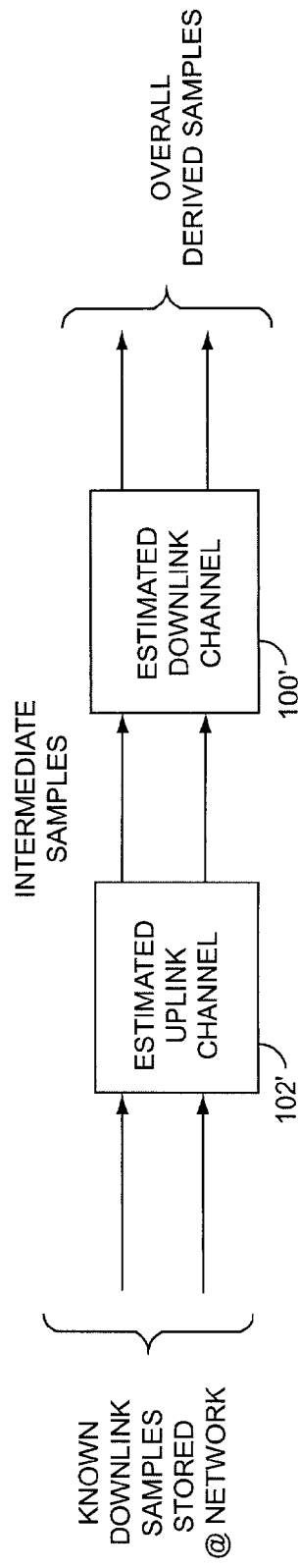
FIG. 12B is a diagram of an exemplary ordering of estimated downlink and uplink channels as used in some embodiments of transmit pre-compensation.

FIG. 12B illustrates that the overall loop channel is unchanged by imagining the order of the uplink and downlink to be reversed. In the reversed case, the samples that occur between the uplink channel 102 and the downlink channel 100 do not correspond with samples that arise in the real situation. These "intermediate samples" are however useful in that they allow the network 10 to estimate the downlink channel 100 by comparing, e.g., correlating, the loop-back signals received from the MSs 16 with the calculated intermediate samples.

Intermediate samples may be calculated by the network 10 based on passing the known downlink samples that were input to transmit filter 98 at the MS 16 through an estimated uplink channel 102' as determined from the pilot codes added to the looped-back signal. Such intermediate samples may then be passed through an estimated downlink channel 100' to generate derived samples subjected to the overall estimated uplink/downlink channel information.

Where more than one network antenna is used to transmit to only a single remote receiver, the parent applications disclose an informational deficiency as regards being able to determine more than one downlink channel from a single loop-back signal. However, such an informational deficiency was overcome in the invention of the parent applications by transmitting independent pilot symbol streams to non-existent receivers through fictitious channels, the fictitious channels being chosen such that the pilot symbol streams are nominally not received at the actual receiver when the network has accurate estimates of the downlink channels. That is, the network 10 generated actual and dummy pilot signals, and then adjusted the dummy pilot signals to reduce interference at the single receiver (e.g., MS 16).

The number of such dummy pilot signals required is generally equal to the difference between the number of network antennas and the number of receivers. If the number of receivers is greater than the number of antennas, it may be that no pilot transmissions are needed to solve the informational deficiency problem. However, occasional unfortunate combinations of channel characteristics can occur that result in informational deficiency in determining the downlink channels between network transmitters and receivers at least at some spot frequencies across the channel bandwidth. The addition of at least one dummy pilot signal can substantially reduce the probability of this occurrence, as is explored more fully later herein.

Figure 13:
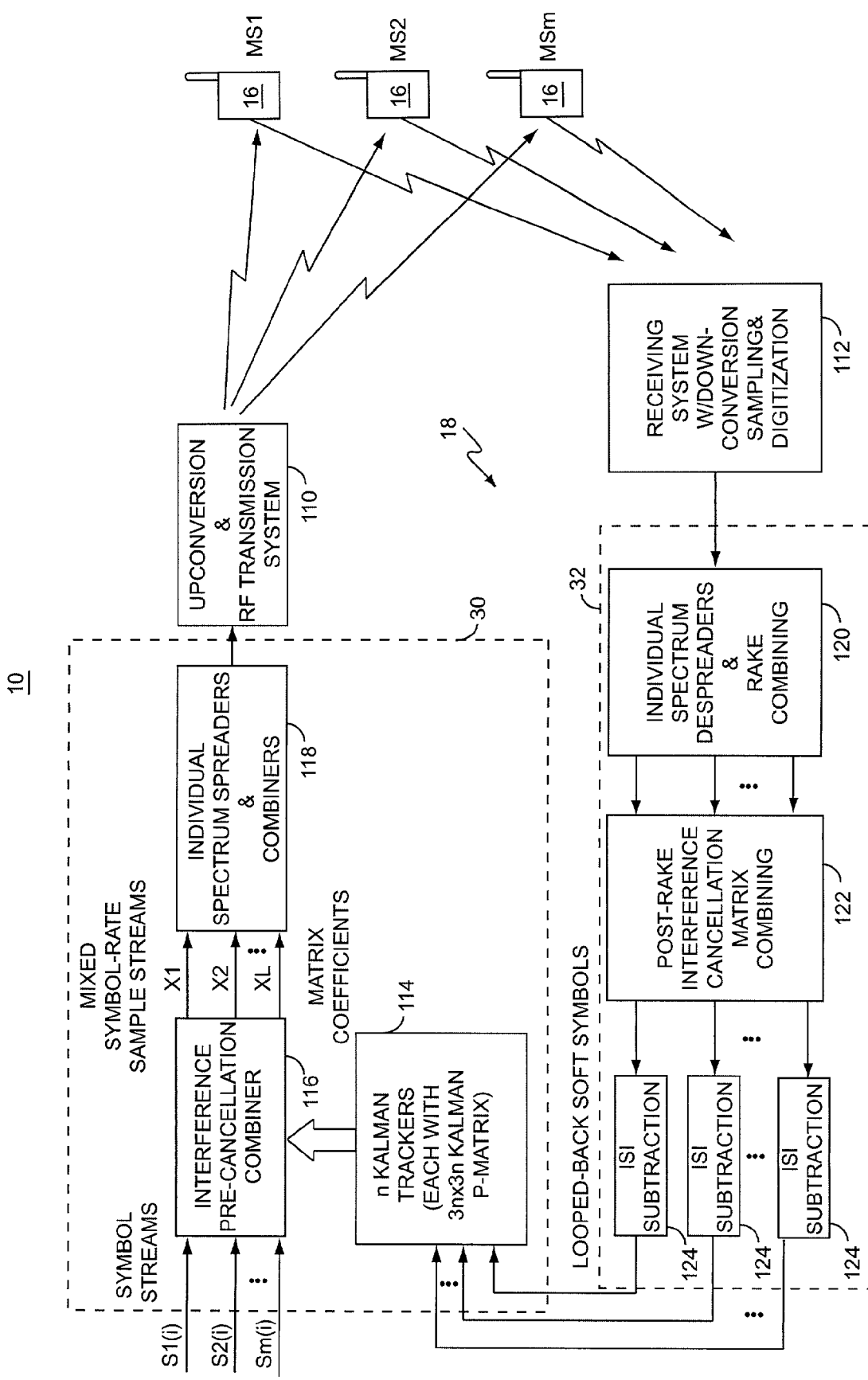
FIG. 13 is a diagram of another exemplary embodiment for transmit pre-compensation.

FIG. 13 illustrates another variation on network 10 as regards loop-back processing and transmit signal pre-compensation. Here, the network 10 includes a network RF transmission system 110, and a RF receiving system 112. These transmission and reception systems may comprise, in some embodiments, one or more BSs 12, or might comprise discrete transmitter/receiver arrangements. In any case, the network 10 transmits combined transmit signals to MSs 16—MS1, MS2, . . . , MSm—through transmission system 110, and receives loop-back signals from these m MSs 16 via receiving system 112. As before, transmit processing system 18 provides transmit signal pre-compensation and loop-back signal processing. Note that memory 34 is not explicitly shown to avoid overcrowding the illustrated elements.

In this embodiment, pre-compensation processor 30 comprises "n" Kalman Trackers 114, with each Tracker utilizing a 3n×3n Kalman "P-matrix," a matrix pre-combiner 116, and spreaders/combiners 118. Loop-back processor 32 comprises despreaders/combiners 120, i.e., RAKE receiver resources, matrix combiner 122, and Inter-Symbol Interference cancellers 124.

The illustrated configuration accommodates a type of loop-back useful in adapting symbol-rate combining for interference pre-cancellation at one or more network transmitters. Symbol streams S1, S2, . . . Sm destined for respective MSs 16—generically represented as MS(i)—are input to matrix pre-combiner 116, which is a linear matrix combiner operative at the symbol rate to produce symbol-rate combined values X1, X2, . . . XL for transmission by transmitters and antennas index 1 to n within transmission system 110. The L symbol-rate signals are spread with respective spreading codes 1 . . . L, which are not necessarily different, but may be any of the same, different, orthogonal and non-orthogonal codes. After spreading with the respective spreading codes, the outputs of the L spreaders are at a chip rate, which is in general an elevated rate compared to the underlying information symbol rate. The L spread signals may then be linearly combined using the chip-rate spreaders/combiners 118 to produce n combined outputs for transmission by respective transmitters 1 to n in transmission system 110.

In an exemplary implementation disclosed in the parent applications, L is equal to the number m of MSs 16, and the number of transmitters n is one. In another exemplary embodiment, L equals twice m (2m) and the number of transmitters in the transmission system 110 is two. In this scenario, the spreaders/combiners 118 then combine signals X1 to Xm for transmission by transmitter (1) and signals X(m+1) to X(2m) for transmission by transmitter (2). Spreading code(i) in the latter case would be equal to spreading code(i+m), so that signals destined for MS(i) from either transmitter (1) or transmitter (2) are spread with the same code. The chip rate combining polynomials in the latter case are preferably the time-reversed conjugate transpose of the channel polynomials from the relevant transmitter to the relevant receiver. That is, the combining polynomials are formed as time-reversed conjugate transposes of the estimated downlink channels for the transmitters (1) and (2) within RF transmission system 110 relative to the MSs 16.

The signals transmitted by network 10 propagate through multipath channels Cij from antennae) to MS(i). MS(i) correlates its received signal with shifts of its assigned CDMA spreading code (i), then combines the correlations with RAKE tap weights to form RAKE combined soft symbols. The soft symbols are then decoded using for example a soft-decision convolutional error correction decoder to reproduce intended information. If the soft symbol values contain too much interference from symbol streams intended for other ones of the MSs 16, the error correction may not be error-free. Therefore, the network 10 adapts the symbol rate precombining matrix polynomials used by matrix pre-combiner 116 to reduce interference on all of the soft values produced by the RAKE receivers at all MSs 16.

To assist the network 10 in this process, the MSs 16 typified by MS(i) loop back the RAKE combined soft values to the network 10 so that the network 10 can determine, based on knowledge of the intended symbol streams S1 to Sm, how much cross-interference is still present at the MSs 16. Each MS 16 therefore re-spreads its RAKE receiver soft output values from symbol rate to uplink chip rate using an uplink spreading code assigned to the given MS 16.

The MSs 16 may add uplink pilot codes to assist the network 10 in determining the uplink channels from the MSs 16 to the network 10, to facilitate separation of the uplink and downlink channel affects on the loop-back signals. However, this action is not in theory strictly necessary to determine whether a given loop-back signal depends on unintended symbol streams. If an uplink pilot code is not used, the network 10 correlates the signal received from MS(i) with shifts of uplink spreading code(i) and, using knowledge of the intended symbol stream Si for MS(i), RAKE combines the correlations to reproduce a RAKE-combined soft symbol value stream for each MS 16.

The network 10 may use receive interference cancellation matrices as disclosed in the parent applications to ensure that the signals received from MS1 to MSm are separated. The separated soft-values are then correlated with symbol streams S1 to Sm to determine if a given soft value stream contains interference from one or more unintended symbol streams. The network 10 then adjusts the symbol-rate combining matrix polynomials used by matrix pre-combiner 116 to reduce the levels of unintended interference.

Various approaches to practicing the above loop-back method exist. In an exemplary approach, the network 10 correlates the signal samples received at antenna(j)—i.e., an antenna within the receiving system 112—delayed by k chips with uplink spreading code(i) over a soft symbol period and obtains a correlation value Vijk which is the looped-back soft-symbol value from MS(i) multiplied by uplink channel propagation coefficient Cijk, and with additive interference from other soft values associated with other ones of the MSs 16.

For clarity, one refers to the symbol stream transmitted by network 10 for MS(i) as S(i), and to the ith symbol within that stream as Si. Originally transmitted symbols Si are known to the network 10 based on its storing its own transmissions in memory 34, and, further, it is known that the RAKE receiver of MS(i) removes the downlink channel phase from the soft output values at MS(i), which means that a given soft output value (symbol) is related to the corresponding transmitted symbol Si for MS(i) by a real scaling factor. Thus, the correlation value Vijk is directly related to symbol Si by channel coefficient Cijk. Channel coefficient Cijk may therefore be obtained by loop-back processor 32 at the network 10 by computing the mean value of Vijk.Si* over some number of symbol periods of symbol stream S(i).

The network 10 may then use the recovered uplink channel polynomials Cij(k=1 . . . q) to form RAKE combining tap weights and interference cancellation matrices to separate the individual soft values looped back from the plurality of MSs 16 (MS1 through MSm). Once the individual soft values are recovered, the soft value stream corresponding to each MS 16 may be correlated with the symbol streams intended for the other MSs 16 to determine how much interference exists in each soft value stream from unintended symbol streams. That is, the soft value stream for MS(k) is correlated with the information symbol streams, S(i) where k≠i to determine cross correlation interference between the symbol stream intended for MS(k) and the symbol streams intended for the other MSs 16.

The amount of interference between symbol streams is a complex amount denoted by a complex factor to be determined. If the spreading codes used for transmission to each MS 16 exhibit a constant cross-correlation from one symbol period to the next, this complex amount may be determined by averaging the correlations of separated, looped-back soft-value stream(k) with symbol stream S(i) to obtain an interference polynomial Iik. If the symbol-rate pre-cancellation matrix used by matrix pre-combiner 116 performed perfectly, polynomial Iik would have zero coefficients for i not equal to k. That is, the interference matrix I would be a diagonal matrix of polynomials representing only interference between successive symbols of the same symbol stream. This type of interference, recognizable as Inter-Symbol interference within the same symbol stream does not have to be cancelled by network 10, as each MS 16 can be equipped with an equalizer to handle ISI after the RAKE combining within the MSs' receivers.

Where cross-correlations between downlink spreading codes are not static, due to the use of continuously varying spreading codes for example, such variations must be removed before correlating the separated, looped-back soft-value streams(k) with the symbol streams S(i). If uplink pilot codes are used in the context of FIG. 13, the network 10 can use pilot code correlations to determine uplink channel polynomials, which are then used to determine a receive interference cancellation matrix used by matrix combiner 122 in separating the uplink signals. The known pilot codes may then be subtracted from the separated uplink signals to leave only the loop-back fraction or portion of the signals received by the network 10 from the MSs 16. The loop-back portion of the received signals is then used by Kalman Trackers 114 as before to determine a cross-interference matrix, the values of which are used to update the symbol-rate pre-cancellation matrix of matrix pre-combiner 116.

If desired, the cross-interference matrix can be reapplied to the known downlink transmissions to determine what each MS 16 receives. This information can then be operated on by the previously determined uplink estimates using the pilot codes to determine the loop-back signals received at network 10. The determined loop-back signal can then be subtracted from the total signal received at the network from a particular MS 16, leaving only the pilot code information from that MS 16, from which a better determination of the uplink channel for that MS 16 can be made. The improvement in estimation of the uplink results from having removed interference to the pilot from the loop-back signal by the above process.

Alternatively, the signals determined to have been received at the MSs 16 can be added to the known pilot signals added at the MSs 16, and the whole used to obtain a better estimate of the uplink channels. Similarly, the pilot codes operated on by the uplink channels from the various MSs 16 can be subtracted at the network 10 to remove pilot code interference from the loop-back signals before analyzing them for determination of downlink channel estimates. Either of the above approaches or any variation thereof can then be iterated to the extent allowed by available processing power at the network 10 in order to obtain successively refined estimates of the uplink and downlink channel polynomial matrices.

At each MS 16, received signal samples can be combined with known pilot symbols and/or uplink information symbols in a variety of ways. That is, the loop-back signal transmitted by each MS 16 may be formed using any number of techniques, or through combinations of selected techniques. In an exemplary approach, the MSs 16 use linear addition to combine signal information received from the network 10 through the downlink channel with locally generated information, e.g., pilot code information. In this approach, each received signal sample is added to a corresponding pilot code sample, and the sum is then upconverted and transmitted by the MS 16. Since both the pilot code information and the original transmissions received by the MS 16 are known to the network 10, it can separate the combined loop-back signal received from the MS 16 as long as the pilot code and the original transmissions from the network 10 are sufficiently uncorrelated.

Another exemplary method uses an alternating approach to loop-back signal formation. With this technique, MSs 16 form their loop-back signals by alternating loop-back signal segments with transmissions of pilot code or information-bearing signal segments by time-multiplexing. That is, the return transmission from each MS 16 to the network 10 alternately comprises loop-back of network transmissions and locally generated transmissions. As noted, the locally generated transmissions may comprise pilot code information, may comprise data transmissions (i.e., information bearing transmissions), or some combination thereof.

Segments of pilot code transmission preferably occur sufficiently close in time to segments of loop-back transmission such that the propagation channels between the network 10 and the MS 16 do not change substantially between the two times, or, at least, can be interpolated accurately from one type of symbol to another type of symbol. In a CDMA implementation of network 10 in which lower-speed data or pilot symbols are spread to a higher chip-rate using a plurality of chips per symbol, a convenient signal segment size for time-multiplexing between loop-back and locally generated signal transmissions at the MS 16 is one such lower-speed symbol time or an integer number of such symbol times. Thus, a set of samples received at the MS 16 is collected over a downlink symbol period and transmitted as a loop-back symbol from the MS 16, followed by transmission of a symbol of data or pilot code originating at the MS 16, and then another looped-back downlink symbol and so on, with the pattern repeating.

Each such symbol can comprise a fixed number of chips, and the pattern of loop-back and pilot code or data symbols transmitted by the MS 16 need not be strictly alternating, but can be in any pattern agreed upon a priori between the network 10 and the MSs 16. In exemplary embodiments, the pattern meets the timing requirement that the uplink and downlink channels are sufficiently unchanged between transmissions of the loop-back signal and the MS's pilot and/or data signal.

In another exemplary embodiment, looped-back signals can be soft symbols formed at the MSs 16, the soft symbols then being combined with optional pilot symbols and transmitted back to the network 10. For example, the soft symbols in the case of a CDMA implementation of network 10 can be the output of RAKE combiners at the MSs 16, and the soft symbols combined with pilot symbols can be respread by the MSs 16 for transmission back to the network 10 using uplink spreading codes assigned to each of the MSs 16.

Since it is in this case possible to estimate uplink channels from the uplink spreading codes, the uplink pilot symbols transmitted by the MSs 16 need not be known symbols, but may be uplink traffic symbols such as digitally coded voice or data traffic. Uplink data traffic could be acknowledgements of receipt of downlink data packets to form a packet acknowledge/request (ARQ) system, for example. Further, as noted above, it is possible to omit pilot code information from the signals transmitted back to the network 10 by the MSs 16, relying instead on the uplink spreading codes combined with the looped-back soft symbols to yield the uplink channel characteristics at the network 10.

With this latter approach, the network 10 estimates uplink channel information based on correlating the signals received at the network 10 with the uplink spreading codes applied by the MSs 16 during the transmission of pilot symbols. Using the estimated uplink channel for a given MS 16, the network 10 estimates the soft loop-back symbols that were generated by the MS 16 by despreading the uplink signal for the MS 16, using a RAKE receiver for example, then subtracting uplink ISI using the corresponding one of the ISI subtractors 124 shown in FIG. 10A.

ISI subtraction is facilitated if soft symbols and pilot symbols are interlaced, so that the ISI from symbols adjacent to the unknown soft symbols results from the known pilot symbols. The soft loop-back symbols reproduced in the network 10 tell it what the corresponding MS 16 is receiving at the output of MS's receiver. These estimated soft symbols should comprise only the intended signal for a MS 16, which will be achieved if the downlink interference pre-cancellation matrix used by matrix pre-combiner 116 is accurate. If there are errors in the downlink interference pre-cancellation matrix however, the soft symbols will contain interference from information symbol streams intended for other mobile terminal receivers. The amount of such cross-interference may be estimated by correlating the soft symbols estimated for a given one of the MSs 16 with the information symbol streams S(i) intended for the other ones of the MSs 16.

An exemplary method for determining the cross-interference between the individual information symbol streams S(i) is to set up and solve a set of simultaneous equations for the unknown interference coefficients. For example, the soft symbol SSi,j emerging at instant(i) from MS(j) may be described in terms of the symbol stream S(i,k) transmitted to mobile MS(k) at instant(i) as follows:

$$SSi, j = \sum_{k=1}^{N} [I_{-1}(j,k) \cdot S(i-1,k) + I_0 \cdot S(i,k) + I_{+1} \cdot S(i+1),k)] \quad (3)$$

In total therefore, there are $3N^2$ coefficients $I_L(j,k)$ to determine, where $L=(-1,0,+1)$ indexes the coefficients describing interference from a previous symbol, a current symbol and a subsequent symbol respectively. There are 3N coefficients for each MS 16, therefore at least 3N simultaneous equations are required to express each MS's soft symbol stream in terms of other MS symbol streams. This requires that each soft loop-back symbol stream be analyzed over at least 3N symbol periods to acquire the requisite minimum number of equations.

The above implementation may be used to demonstrate an alternative exemplary method of solving for interference or channel coefficients rather than collecting and then analyzing blocks of signal samples at the network 10. This alternative method, in its various embodiments, uses the technique of continuous sequential least squares estimation, which enables a refinement to be carried out to a previous set of estimates upon receipt of each new signal sample or loop-back symbol. Thus, it is not necessary to wait for the collection of a minimum block of data in order to obtain a solution for the unknown quantities, providing a previous estimate, however coarse, was already available.

The Kalman Filter is a suitable sequential least squares algorithm, but other approaches include sequential least squares with exponential de-weighting of older data, or continuous least squares with no exponential de-weighting. All three techniques, abbreviated to Kalman, Exponential Forgetting, and Least Squares Forever respectively, are essentially identical in their mathematical formulations and programming, and differ only in one detail step.

The general mathematical formulation, as applicable to the Kalman process contemplated herein for example, comprises the following steps:

1. INITIALIZATION: Assuming there are M parameters to be estimated, there is an M×M matrix denoted by P which is initialized to a large diagonal matrix. The initial parameter values may be set to some intuitive starting point. For example, for interference coefficient estimation, it may be assumed initially that $I_{-1+1}(j,k)$ =0, and that $I_o(j,k)$=0 for j not equal to k (i.e. that there is no Intersymbol Interference and no cross-interference) and that $I_o(j,j)$ equals the mean magnitude of looped back soft symbol streams) from MS(j). In the current problem, M=3N and comprises the 3N values of IL(j,k) for a particular value of j and the 3 values of L and the N values of k. There are N separate instances of steps 1 to 8 with N separate P-matrices, corresponding to each MS 16, i.e. each separate value of "j".

2. PREDICTION: Using the known transmitted symbol streams and the current best estimate of the interference matrix, the network 10 predicts what the value of the next looped-back soft symbol should be.

3. ESTIMATION: The network 10 determines an estimate of the actual value of the looped back soft symbol from the loop-back signal received at the network 10, using uplink channel estimates as described earlier.

4. COMPUTATION: The network 10 computes the error E between the soft symbol predicted in Step 2 and the "measured" soft symbol from Step 3.
5. MODIFICATION: The network 10 modifies the estimates of the subset of 3N I-matrix values in such a direction as to reduce what the error calculated in Step 4 would have been, using the formula, $$Inew = Iold - E.P.G/(1 + G^\# PG) \quad (4)$$

where Inew and Iold are column vectors of the 3N updated and previous values of the I-matrix values; P is the associated 3N×3N Kalman matrix in Kalman Tracker 114; G is a column vector of 3N values, which is the gradient of error E with respect to each I-value. The G-values may be deduced by network 10 based on differentiating the equation for the soft symbol SSi,j given above with respect to each I-value in turn, which yields the coefficient of each I-value, namely the associated symbol of a symbol stream. Thus the Gradient vector is:
   S(i−1,1)
   S(i,I)
   S(i+1,1)
   S(i−1,2)
   S(i,2)
   S(i+1,2)
   S(i−1,N)
   S(i,N)
   S(i+1,N)
6. REDUCTION: The network 10 reduces the determined P-matrix using the formula $$P \mathrel{<=} P - PGG^\# P/(I + G^\# PG) \quad (5)$$

7. MODIFICATION: Increase the P-matrix by either
   Adding a Q-matrix, usually diagonal (for Kalman), or
   -Multiplying the elements of P by a constant greater than unity (for Exponential Forgetting);
   or, -for "Least Squares Forever", the P-matrix is not changed in this step, but allowed to collapse forever with successive reductions at step (6).
8. REPETITION: The network 10 repeats from Step 2 to process each new loop-back symbol.

In the above steps, all quantities can be complex numbers and the superscript # denotes the conjugate transpose. Further, the P-matrix has Hermitian symmetry and at Step 6 only half of the off-diagonal values of P need be updated, e.g. the upper triangular half, and the remainder of P's values set equal to their complex conjugates. This procedure compensates for rounding errors in such algorithms, which errors allows growth of a non-Hermitian error part within matrix P unless P is forced by this error compensation measure to remain Hermitian.

One advantage of the sequential least-squares approach over the block-solution approach described earlier is that one need not be concerned with the possibility of the block-solution matrix momentarily becoming singular. When such momentary singularity occurs, the block-sequential approach may "freewheel" in solution directions that are underdetermined.

A navigational analogy illustrates such potential freewheeling, wherein obtaining a new measurement that suggests a position on a given line running NE-SW, which does not run exactly through a previous position estimate. The new position is not uniquely determined by the new measurement alone, but a best update of the position involves moving from the old position along a perpendicular dropped to the given NE-SW line, which conforms the position to the new measurement with the least change from the old position. This approach causes minimum disturbance to the coordinates in the planes not determined by the new measurement. Thus, moving along a perpendicular towards the new constraint line is not always optimum, depending on how "stiff" the previous solution was in latitude and longitude respectively. By analogy, the above approach records such "stiffness" of previous solutions in the P-matrix of the above formulation, which thus determines the best direction in which to move the old interference cancellation solution to obtain a refined interference cancellation solution.

Each time a refined estimate of the residual interference matrix is obtained, the transmit interference pre-cancellation matrix used by matrix pre-combiner 116 is updated by Kalman Trackers 114 in such a way as to drive the off-diagonal polynomials of the interference matrix I towards zero, thereby improving the cancellation of interference between symbol streams intended for different MSs 16.

Stepping through the above process in the context of FIG. 13, individual information symbol streams S1, S2, . . . Sm are intended for transmission to respective ones of the plurality of MSs 16, MS1, MS2, . . . MSm. The symbol streams are combined in interference pre-cancellation matrix pre-combiner 116 to produce mixed sample streams X1, X2, . . . XL, which are still at the symbol rate. Mixed sample Xk at instant i is denoted by Xk(i) and depends on S1(i) . . . Sm(i) and also on S1(i−1) . . . Sm(i−1) as well as S1(i+1) . . . Sm(i+1) and possibly earlier or later symbols, depending upon delay spread relative to symbol timing. Spreaders/combiners 118 then multiply the mixed sample streams by respective spread-spectrum codes for transmission to the MSs 16. The spread-spectrum codes may be orthogonal codes such as those selected from a Walsh code set scrambled with a common, multiplicative, complex scrambling sequence. Non-orthogonal spreading codes also may be used.

The output of spreaders/combiners 118 is applied to transmission system 110, which, as noted earlier, can include a single antenna at a single site; diversity transmission using cross-polarized antennas at the same site, or diversity transmission using multiple antennas at different sites, as described herein and in the parent applications. Transmit processing system 18 may be extended such that transmission system 110 includes chip rate pre-filtering to optimize or otherwise improve transmission efficiency by directing transmit signals to particular ones of the MSs 16 through the lowest loss downlink channel(s).

Figure 14:
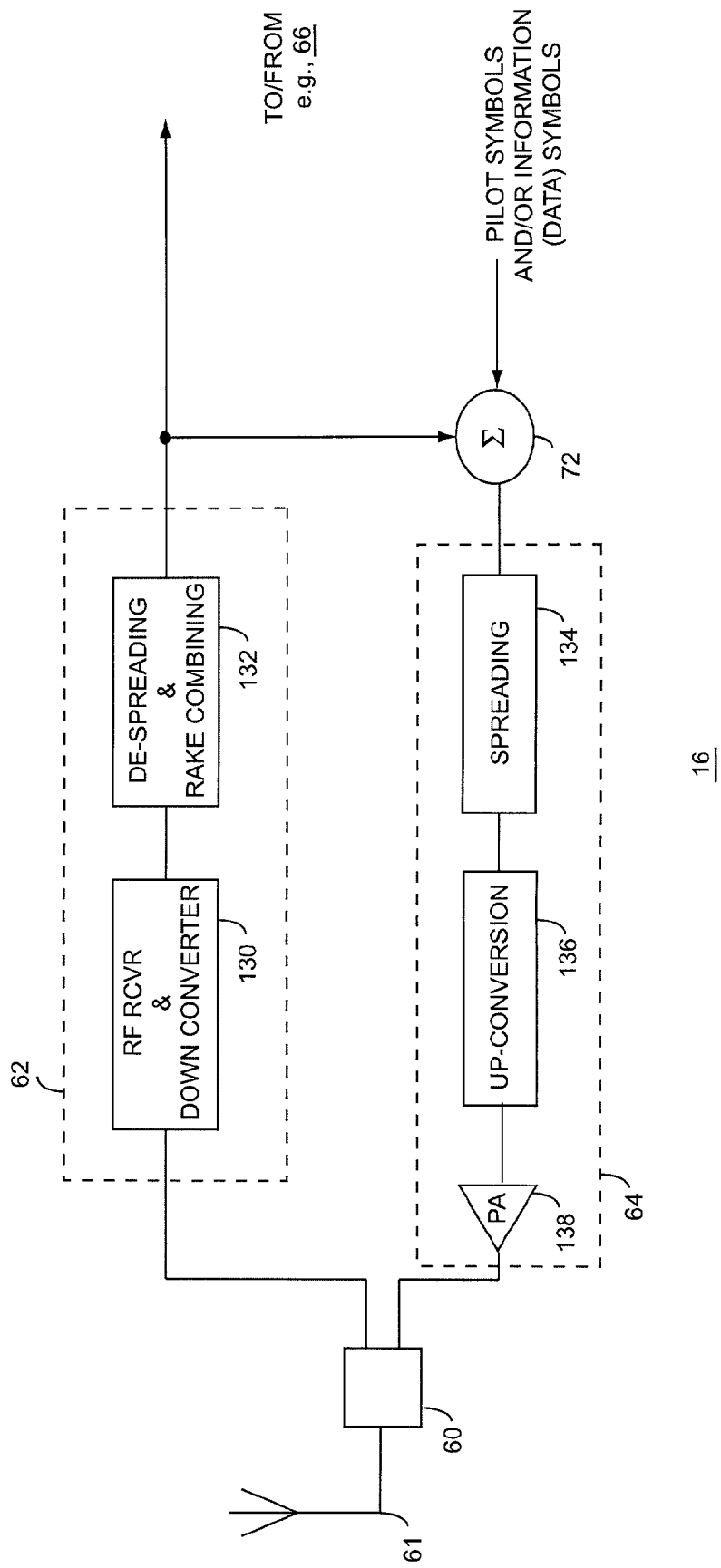
FIG. 14 is a diagram of an exemplary RAKE receiver-based mobile station.

FIG. 14 illustrates exemplary details for the MS 16 similar to those shown earlier in FIGS. 7A and 11, for example. However, in this illustration, the MS receiver 62 explicitly includes RAKE receiver resources. More particularly, receiver 62 in this exemplary embodiment includes receiver/downconverter resources 130 and despreading/RAKE combining resources 132. MS 16 receives a composite received signal from the network 10, which it processes, despreads, and RAKE combines to produce soft output values representative of the information symbols specifically intended for that MS 16, allowing, of course, for some amount of interference from the unwanted signals and other interference within the composite received signal.

Where the MS 16 employs simultaneous reception and transmission, duplexer/switch 60 comprises a duplexer to isolate transmit and receive frequencies on the MS antenna 61; where MS 16 alternates between transmission and reception, duplexer 60 might simply comprise a switch operative to alternately connect the receiver 62 and transmitter 64 with the antenna 61.

In any case, the soft output values obtained at the output of the despreading/RAKE combining resources 132 are available for loop-back to the network 10. As such, a summer 72 might be used to combine the soft symbols with pilot and/or data symbols generated locally at the MS 16. The soft symbol values are obtained based on receiver/downconverter resources 130 amplifying, downconverting, and digitizing the received composite signal to generate a stream of complex numbers. De-spreading/RAKE combining resources 132 multiplies these complex samples by a locally generated despreading code or codes corresponding to the code or codes used for spreading at the network 10. The despreader/RAKE combiner resources 132 average the resultant product over each symbol period to produce symbol-rate despread sample streams. Different sample streams are produced for different timing shifts of the locally generated spreading code relative to the received signal samples. These time-shifted resultant sample streams are then combined by weighting with the complex conjugates of respective downlink channel coefficients estimated by the MS 16. Further explanation of RAKE receiver techniques and channel estimation for RAKE combining may be found in U.S. patent application Ser. No. 09/247,609, entitled "MAXIMUM LIKELIHOOD RAKE DECODER FOR CDMA SIGNALS" to Applicant Dent, filed Feb. 10, 1999, and in U.S. patent application Ser. No. 09/227,180, entitled "SMOOTHING CHANNEL ESTIMATES by SPECTRAL ESTIMATION", to Applicant Dent, filed Jan. 7, 1999, both of which are hereby incorporated in their entireties by reference herein.

Of course, in the context of this embodiment of the present invention, RAKE receiver operations differ from conventional RAKE receiver processing in that the MS 16 loops back soft output values obtained by RAKE combining at the MS 16. That is, the despreading/RAKE combining resources 132 provide soft output values (soft symbols) for error-correction decoding by a soft decoder (not shown, but may be part of baseband processor 66), as well as providing the determined soft symbols for looping back via the transmitter 64. Prior to looping back, the MS 16 may combine, using summer 72 for example, known pilot symbols or other locally generated information with the soft symbol output from the receiver 62. Such combining may, as noted earlier herein, involve linear combining and/or time-multiplexed combining. With a time-multiplexing approach, the MS 16 does not necessarily multiplex all soft symbols with pilot symbols, but only a sufficient number to allow network 10 to determine cross-interference between the different symbol streams intended for the MSs 16 from the loop-back symbols.

Where linear addition is used by the MS 16, one method of additively combining pilot symbols with soft symbols adds a pilot symbol value (which may be real or complex) to a complex soft symbol value on a one for one basis, i.e. the pilot symbol stream is time-aligned with the soft-symbol stream. However, certain advantages may obtain from adding the pilot symbol stream to the soft-symbol stream with a half-symbol time offset, so that the same pilot symbol adds to the last half of one soft symbol and the first half of the next. With this offset-combining approach employed by the MSs 16, the network 10 uses correspondingly offset integration periods when correlating the loop-back signal to despread the soft symbols as compared to despreading the pilot symbols.

Figure 15:
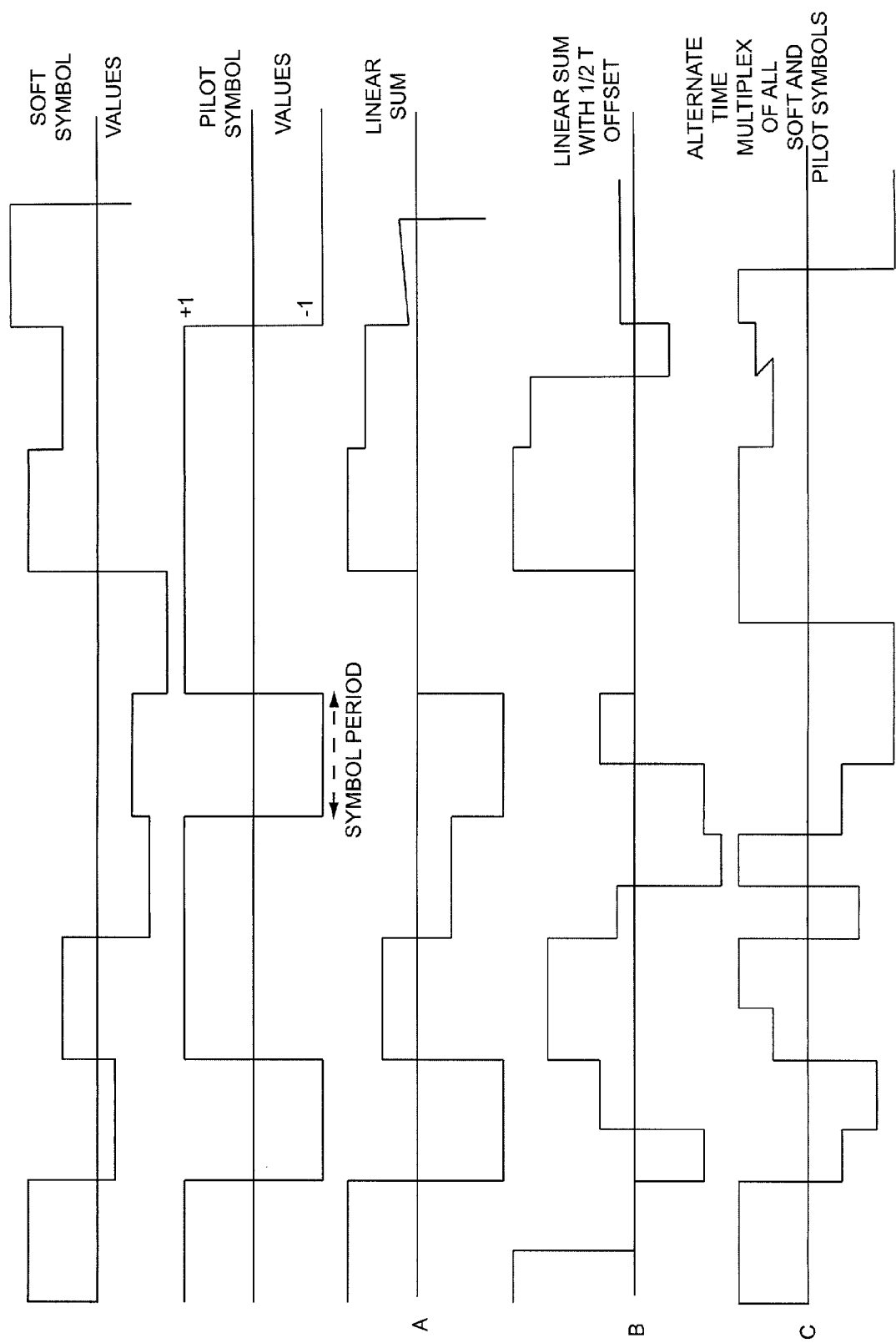
FIG. 15 is a diagram of exemplary loop-back signal formation.

Possible exemplary combining methods for loop-back signal generation at the MSs 16 are illustrated in FIG. 15. Waveform A is obtained by linearly adding soft symbol values to pilot symbol values that are time-aligned with the soft-symbol periods. Waveform B illustrates linear addition of the soft-symbol values to pilot code symbols shifted to the left by half a symbol period. Waveform C illustrates the result of alternately time-multiplexing a soft-symbol with a pilot symbol to produce a loop-back symbol stream of double the underlying symbol rate. If the symbols are complex, as is the case generally, the real-value combining illustrated in FIG. 15 applies likewise to combining the corresponding imaginary values.

Other loop-back signal variations are possible, such as time-multiplexing only half the soft symbol values with half as many pilot symbol values per unit time in order to maintain a combined symbol rate equal to the original soft-symbol rate. Other variations can comprise linear addition of a pilot symbol stream that is of a different symbol rate than the soft symbol stream rate, or multiplexing two out of every three soft symbols with one pilot symbol every three symbol periods, or other such combinations.

Where the MSs 16 generates loop-back signals by linearly adding pilot codes to the received downlink signals, the network 10 can, for a given MS 16, improve estimation of both uplink and downlink channels by the following iterative methods:

1. Estimate uplink channels by correlation of the loop-back signal with the added pilot code.
2. Apply the estimated uplink channel to the pilot code to obtain a pilot subtraction sequence and subtract the pilot subtraction sequence from the loop-back signal to obtain a pilot-free loop-back signal.
3. Apply the estimated uplink channel to the known downlink transmitted symbol stream to obtain a sequence for correlating with the pilot-free loop-back signal to obtain downlink channel estimates.
4. Apply the estimated downlink and uplink channels to the known downlink transmitted symbol stream to obtain a downlink subtraction sequence and subtract the downlink subtraction sequence from the loop-back signal to obtain a downlink-free loop-back signal.
5. Repeat step 1 using the downlink-free loop-back signal in place of the original loop-back signal to obtain improved uplink estimates.
6. Iterate from step 2 using the improved uplink estimates until no further significant improvement is obtained.

The above sequence represents an exemplary approach to the iteration sequence, but exemplary alternative approaches may be used. However, all approaches that have the effect of removing pilot code interference when estimating the downlink channel or removing looped-back downlink symbol interference when estimating the uplink channel are equivalent and therefore fall within the scope of the present invention.

Conversely, when the uplink symbols originating at a given MS 16 are not known pilot signals but rather unknown uplink traffic symbols that the network 10 must decode, removal of the loop-back signal interference reduces errors in decoding the uplink traffic symbols. Such interference removal may be based on the network 10 remembering what it transmitted on the downlink for comparison with returned loop-back signals corresponding to those remembered transmissions. Variations of such methods can be used where the MS 16 forms its loop-back uplink transmission either by combining samples directly from the received composite signal (i.e., non-despread downlink values) with pilot code samples, or by combining de-spread soft symbol values with pilot symbol values.

When the time-multiplexing method of combining received downlink signals with pilot signals is used by the MS 16, such as shown in Waveform C of FIG. 15, there is much reduced interference between pilot and downlink signals, except for the effect of multipath smearing at the edges of the symbol period. If desired, the above subtraction method can still be used to remove the residual smearing effect.

Where the MS 16 combines soft symbols with pilot/data symbols in loop-back signal generation, the combined symbols are respread using an uplink spreading code in spreader 134 of MS transmitter 64. The uplink spreading code timing is generally given a predetermined alignment with the soft symbols and the pilot symbols so that the network 10 knows a priori where symbol boundaries lie. The re-spread combined symbols output by the spreader 134 are upconverted to a transmit frequency by up-converter 136, and then amplified to a transmit power level by transmitter PA 138 for transmission as the loop-back signal back to the network 10.

Returning to FIG. 13, the network 10 receives signals from the m MSs 16 in receiving system 112, which may comprise one or more receiving antennas at one or more sites. These received signals are filtered, amplified, down-converted, sampled and digitized to produce streams of complex numbers for despreading and separation of the loop-back signals from the different MSs 16. One method of enhancing separation of the loop-back signals received from multiple MSs 16 appears in FIG. 13, which method may be termed "post-RAKE interference cancellation."

First, the complex sample streams output from receiving system 112 are despread by despreader/RAKE combiner 120 using shifts of the corresponding uplink spreading codes used by respective MSs 16 to produce despread streams. The despread streams corresponding to different timing shifts, i.e. to different multipath rays, are then weighted with multipath channel coefficient estimates and RAKE-combined. The RAKE combining may also include combining signals de-spread from multiple receive-system antennas, i.e. diversity combining.

The diversity-combined symbols may comprise diversity combined pilot symbol streams from which the uplink channels are estimated, and looped-back soft symbol streams from the MSs 16. The pilot symbols used by the MSs 16 are known to the network 10 and may be subtracted or gated out of the RAKE combined sample streams. The RAKE combined soft sample streams also may comprise some mutual interference between signals looped back from the different MSs 16. Such loop-back signal interference can be removed by application of the post-RAKE interference cancellation matrix to the loop-back symbol streams in interference-cancellation matrix combiner 122. Such interference cancellation involves multiplying the loop-back symbol streams by the inverse or adjoint of a cross-coupling matrix derived from uplink channel estimates and correlations between the known uplink codes (both of which may be time-variable from one symbol period to the next).

Such post-RAKE interference cancellation may leave Intersymbol Interference between adjacent looped back symbols un-cancelled within the obtained soft output value streams output by the interference cancellation combiner 122. ISI subtractors 124 subtract this ISI using estimates of uplink channels and the autocorrelation of each spreading code. ISI subtraction can be equated with equalizing when the post-RAKE interference rejection employed by the network 10 uses the adjoint rather than the inverse of the cross-coupling matrix. The difference between the adjoint versus the inverse matrix approach is that omission of division by the cross-coupling matrix determinant (an IIR filter) in the case of the adjoint matrix leaves ISI uncompensated. Likewise, dividing by a reduced determinant leaves some ISI un-cancelled due to some poles being omitted from consideration by virtue of using the reduced determinant.

If ISI subtraction as implemented by ISI subtractors 124 represents an ill-conditioned process due to determinant roots near the unit circle, it is possible instead to adapt the Kalman Trackers 114 to process looped back symbols with known ISI. Regardless, the principle of Kalman Tracker operation is the same, namely, to predict the looped back soft symbols for the MSs 16 using the current values of parameters that the included Kalman filters are supposed to be tracking; to compare these predicted values with actual values observed at the outputs of the ISI subtractors 124 (or directly from interference-cancellation combiner 122); and then refine the tracked parameters in such a direction as to better approximate the observed values.

In general, there is one Kalman Tracker within Kalman Trackers 114 to process each signal looped back from a corresponding MS 16, and each Tracker tracks 3n residual interference coefficients, giving 3 $n^2$ coefficients representing $n^2$ 3-coefficient polynomials. The order of these polynomials depends on how the extent of neighboring symbol interference for each symbol(i) at each MS 16. If more than the immediately adjacent symbols have an effect on the current symbol(i), the polynomial order would be greater than 2, for example 4 (for five coefficients), and each Kalman Tracker at the network 10 would then track 5n parameters.

The estimated residual interference coefficients output from the Kalman Trackers 114 are used to refine the coefficients of the interference pre-cancellation matrix polynomials that form the interference cancellation matrix used in the matrix pre-combiner 116 such that each MS 16 receives only its intended symbol stream with insignificant interference from symbol streams intended for other MSs 16.

For the Kalman tracking filters to correctly provide a smoothed or mean value of the residual cross-interference polynomial coefficients, the presumption that these coefficients are relatively constant must be true. If the effective averaging time of the Kalman filters used by Kalman Trackers 114 is more than one symbol period, then the downlink channels must not change significantly over that number of symbol periods; nor may the cross-correlation between downlink codes used to spread the various signals transmitted from the network 10 vary from symbol period to symbol period. The latter requirement is satisfied if the same spreading code chip block is used to spread each successive symbol of the same symbol stream. Using time-varying downlink spreading codes that exhibited constant autocorrelation and cross-correlation properties would also satisfy the requirement.

However, one may alleviate such requirements for the downlink spreading code properties by developing a method of separating the interference matrix into a first part and second parts. In this exemplary approach, the first part arises from the known variations of code cross-correlations and does not need to be "learned" by the Kalman process, while the second part arises, at least in part, from time-varying fading channels that do need to be learned by the Kalman process. That is, the Kalman Trackers 114 are made responsive to changes in interference at the MSs 16 arising from changes in the downlink channels between the network 10, while being isolated from those changes arising in cross-correlation variations arising from dynamically changing downlink spreading codes.

In further detail, an alternative expression for the soft-symbol output of a given RAKE receiver is as follows, $$SS_u(t) = C_i^{\#}(t) \cdot H_{i-k}(t) \cdot C_k(t) \qquad (6)$$

In the above expression, C represents the RAKE tap weightings used in a given one of the MSs 16, which are based on downlink channel estimates made by that MS 16. These values are more or less smoothed versions of the instantaneous downlink channel values $C_k(t)$. The network 10 can employ a standard model representing how the MS 16 derives these smoothed RAKE tap weights, the model allowing the C values to be computed at the network 10 given a history of network-estimated Ck(t) values prior to the current time instant "t."

The coefficients $H_j(t)$ are totally known from the spreading codes and information symbol streams transmitted by the network 10. Thus, $H_j(t)$ simply represents the correlation over the symbol interval "t" between the code segment used for that symbol and the sum of everything transmitted from the network antenna, i.e., the composite CDMA signal, with a relative shift of "j" chips. These values can be formed in real time by the network 10, to obtain a sequence of H-values at the information symbol rate, using each MS's code, the H-values being passed to the Kalman Trackers 114 for the respective MS 16.

The above equation expresses the expected loop-back soft symbol value as a linear function of the values $C_k(t)$ to be estimated, if $C_i^{\#}(t)$ are considered to be known. Therefore, the above expression is a suitable formula for predicting the loop-back value for Step 2 of the above-described Kalman process. The gradient vector G needed by the Kalman process in Steps 5 and 6 may be deduced from the above equation to be given by $$G_k = C_i^{\#}(t) \cdot H_{i-k}(t), \qquad (7)$$

with implied summation over the index i. Thus, the Kalman process proceeds by using the appropriate correlations H, computed for each symbol period anew, to explain the systematic variation in the loop-back value due to changing downlink spreading codes, thus leaving only the unknown channel variations to be tracked by the Kalman Trackers 114. After each update to the tracked channel values $C_k(t)$, the standard model employed by the network 10 for deriving RAKE tap weights is used to update the values $C_i^{\#}(t)$.

Thus, the network 10 might not receive soft output values as part of the loop-back signals from the various MSs 16, but rather might derive such information based on processing loop-back samples of the composite signals received at the MSs 16 based on the network's models of the receivers 62 used in the MSs 16.

If necessary, the standard RAKE model used by network 10 can be different for each MS 16. The types of MSs 16 involved in the transmit pre-compensation scheme are known to the network 10 based on a number of approaches. In a first instance, the network 10 interrogates the MSs 16 to obtain "classmark" information, which the network 10 then relates to RAKE tap models in a repertoire of RAKE tap models stored against classmarks in the network 10. In a second instance, the network 10 obtains such information from a database of information relating to the particular subscriber and accessed by mobile telephone number "MIN" (Mobile Identification Number) or "IMSI" (International Mobile Subscriber Identification), or from a database of MS characteristics accessed by the MSs' ESN (Electronic Serial Numbers).

The latter approach may be more appropriate when the IMSI relates to a "smart card" or other intelligent peripheral rather than to a particular mobile phone (i.e., MS 16). A known model of the method used by the mobile terminal to derive RAKE tap weights from channel estimates may alternatively be used in a non-linear Kalman filter formulation.

In general, then, the exemplary embodiments of network 10, as a multiple-input, multiple-output (MIMO) system, discussed above illustrate that performance on the downlink can be improved through the use of MS feedback. That is, transmit signal pre-compensation may be performed by the network 10 to, among other things, improve transmission efficiencies and reduce interference at the MSs 16. Such pre-compensation processing is based on the network's knowledge of downlink channel conditions as acquired by processing loop-back signals from the MSs 16. The discussion now turns to additional exemplary approaches directed to formulation of downlink channel information at the MSs 16 for return transmission to the network 10.

Another exemplary embodiment of transmit signal pre-compensation uses mobile-estimated downlink channel state information received at the network 10 via loop-back signaling by the involved MSs 16. This mobile-estimated approach to determination of downlink channel information involves the MSs 16 formulating loop-back information as specifically-defined bit sequences from which the network 10 re-constructs downlink channel state information that may then be used in transmit signal pre-compensation as generally described above.

While the mobile-estimated approach is discussed in considerably more detail below, it generally involves, as noted, each MS 16 transmitting bit sequences whose structure is known a priori to the network on a reverse channel, wherein the bit sequences represent downlink channel state information as estimated by the MSs 16. The network 10 might, within a given network service area in which a particular group of one or more MSs 16 are operating, define a common feedback channel (CFC) as a shared reverse link on which the MSs 16 in that group transmit loop-back information in the specified format.

Where the network 10 has such a reverse link available, the MSs 16 may use that existing reverse link; hence, implementing the method does not require any change to the architecture of existing MSs 16. Such digital reverse links are defined by essentially all of the existing and developing wireless communication standards. An exemplary embodiment of the mobile-estimated method defines a common feedback channel (CFC) per site or individual sector of network service coverage, and all MSs 16 within that site can share the CFC for feeding back their channel state information to the network 10.

For WCDMA systems, simulations of this approach demonstrate that the power dedicated to the CFC can be of the same order as the power currently dedicated to one voice channel on the reverse link of the WCDMA standard. For example, assuming four network transmit antennas, which may be co-located at a given BS 12 supporting the network area of interest, and further assuming one receive antenna at a given MS 16, simulations indicate transmit pre-compensation performance within 1 dB of that obtainable with perfect downlink channel knowledge. Furthermore, such simulations indicate that to achieve a data rate of 5 Megabits/sec, a BS 12 using 4 transmit antennas and using estimated channel knowledge gained from exemplary mobile-estimated approaches disclosed herein requires approximately 10 dB less signal-to-noise ratio (SNR) than the comparable setup using one transmit antenna.

In an exemplary embodiment, the network 10 schedules sharing of the CFC resource between individual mobiles in a group of MSs 16. That is, the MSs 16 in the group share the CFC as a common reverse link channel in TDMA fashion, with the network 10 scheduling use of the CFC by each MS 16. With this approach, each MS 16 estimates its downlink channels, and the resulting estimated channel coefficients are converted, in a manner described more fully later herein, to a sequence of 2×P×B bits, where P and B are design parameters. Any subsets of these 2×P×B bits can be used by the network 10 to reconstruct the original downlink channel coefficients (naturally, the larger the number of bits used for this reconstruction, the better the quality of the resulting reconstruction). In an exemplary arrangement with B=1, all bits in the 2×P×B sequence of bits contribute equally to the quality of the reconstructed channel coefficients, i.e. there are no least-significant/most-significant bits in the representation. In an exemplary embodiment of sequence loop-back with 2×P×B bits, these bits are transmitted uncoded on the reverse link to the network 10; hence, no new coding scheme needs to be defined for the CFC.

In some wireless applications, multiple MSs 16 share a common downlink channel in TDMA fashion. The IS-856 standard, defining a High Data Rate packet service using CDMA, is a notable example of such a scheme. With such standards, the network 10 schedules the MSs 16 on the downlink channel such that each is served according to a desired scheduling scheme, such as according to a proportional fairness scheduling algorithm.

With downlink scheduling, the network 10 or, more particularly, a given BS 12, may request that the next-scheduled MS 16 report feedback information to the network, i.e., report current downlink channel estimates to the network 10. With such feedback, the network 10 can apply transmit signal pre-compensation to the signals transmitted to the reporting MS 16 during the scheduled service to that MS 16. Thus, the network 10 can schedule which MSs 16 report feedback information to it on the time-shared CFC based on its scheduling of forward link service to the MSs 16.

Figure 16:
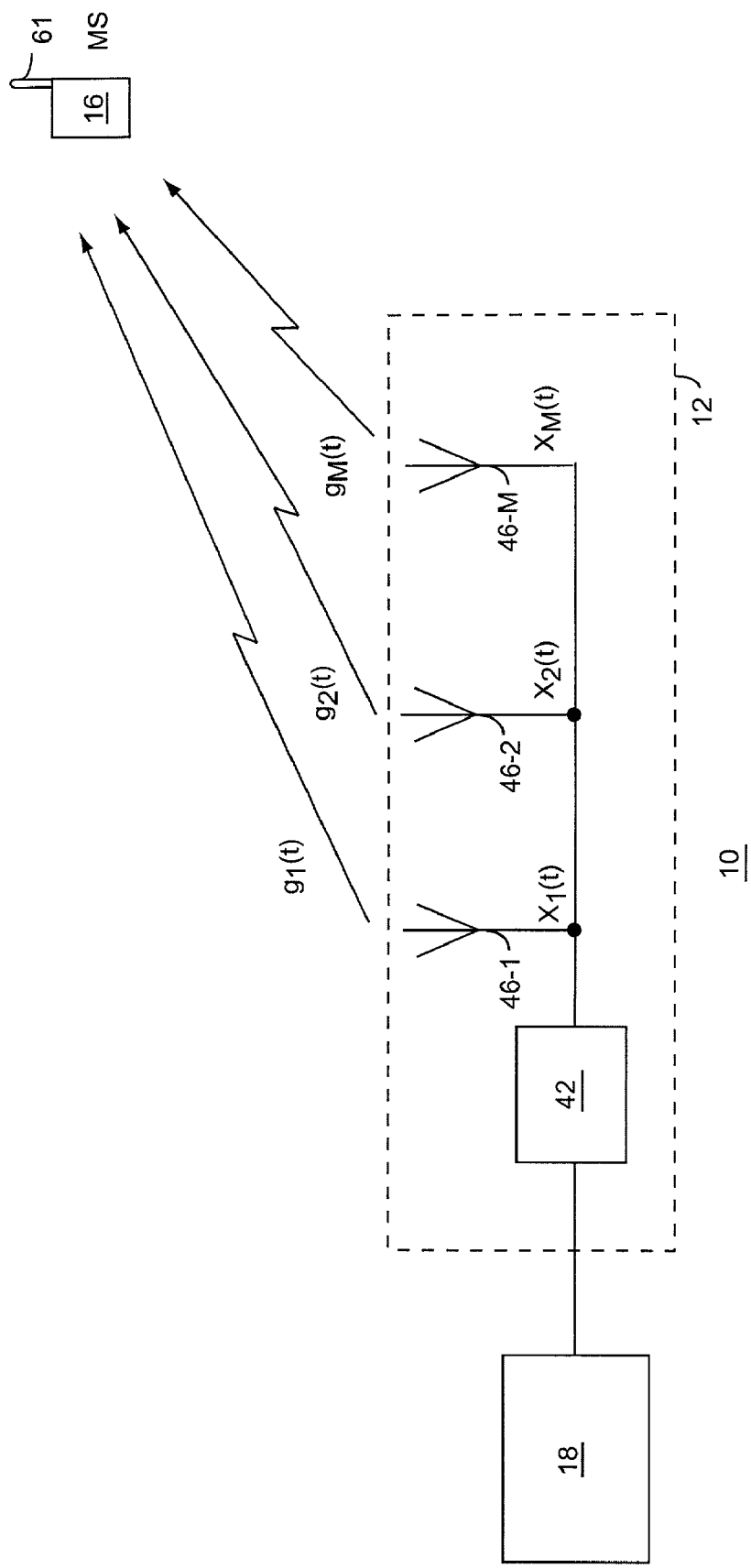
FIG. 16 is a diagram of exemplary transmit pre-compensation based on mobile-estimated transmit channel information.

In an exemplary embodiment of mobile-estimated downlink channel state feedback, FIG. 16 illustrates the use of multiple antennas 46-1, 46-2, and so on, at a given network BS 12; however, a single antenna 46 with multiple transmitting elements may be used as well. Here, antennas 46-1 through 46-M transmit signals to a given MS 16, denoted as MS1. As illustrated, the MS1 includes one receive antenna 61. Thus, in the illustration, M network antennas are used to transmit to a MS 16 having one receive antenna. It should be noted that the same method can be applied to the case with multiple receive antennas at the MS 16 (i.e., the method applies where spatial diversity is employed at the receiver).

In FIG. 16, there are M downlink channels from the BTS to MS1, and the medium part of the channel from the m-th transmit antenna of the M transmit antennas to MS1 has an impulse response $g_m(t)$ in the continuous-time domain. Given a sampling interval Ts at the mobile receiver, one can model the m-th downlink channel as, $$g_m(t) = \sum_{k=1}^{K} a_{m,k}\delta(t-\tau_k) \; m=1,\ldots,M. \tag{8}$$

Each MS 16 can form an estimate of its own $g_m(t)$ according to:

$$\hat{g}_m(t) = \sum_{k=1}^{Q} \hat{a}_{m,k}\delta(t-n_k \cdot T_s) \; m=1,\ldots,M. \tag{9}$$

where $T_S$, the sampling interval, is used to quantize the delays $\tau_k$'s. For example, in a wireless system employing direct spread CDMA on the downlink, the sampling interval $T_s$ could be less than one chip duration. Note that the "Q" index value in Eq. 9 is not necessarily the same as the "K" index value in Eq. 8. That is, the MS 16 might generate estimates for fewer than the actual number of multipath components of the m-th down link channel. Regardless, each estimated $\hat{g}_m(t)$ can be conceptually associated with a discrete-time finite impulse response filter with Q non-zero coefficients, i.e., $$\hat{g}_m(t) \longleftrightarrow \hat{g}_m[n] = \sum_{k=1}^{Q} \hat{a}_{m,k}\delta[n-\hat{n}_k] \; m=1,\ldots,M \tag{10}$$

where the $\hat{a}_{m,k}, \hat{n}_k$ are the estimated path coefficients (downlink channel coefficients) and corresponding estimated delays.

Consequently, communicating channel estimates $\{\hat{g}_m(t)\}_{m=1}^{M}$ to the network 10 is equivalent to communicating the discrete time channel estimates $\{\hat{g}_m[n]\}_{m=1}^{M}$ to the network 10. To communicate $\{\hat{g}_m[n]\}_{m=1}^{M}$ to the network 10, e.g., to a BS 12, an exemplary embodiment of mobile-estimated channel feedback forms a scalar-valued sequence s[n] from the $\hat{g}_m[n]$'s according to:

$$s[n] = \sum_{m=1}^{M} \hat{g}_m[n] * p_m[n] \; n=1,\ldots,P \tag{11}$$

where the $p_m[n]$'s are independent, real-valued, pre-determined, pseudo-random sequences. For example, the sequences may be i.i.d. samples uniformly distributed between [−1,+1].

Next the MS 16 quantizes the real part of s[n] (denoted as $s_R[n]$) and imaginary part of s[n] (denoted as $s_I[n]$) to a desired number of bits, i.e., the MS 16 forms two binary sequences $b_R[n]$ and $b_I[n]$ according to:

$$b_R[n]=Q_B(s_R[n]) \; n=1,\ldots,P \tag{12}$$

$$b_I[n]=Q_B(s_I[n]) \; n=1,\ldots,P \tag{13}$$

where $Q_B(\cdot)$ denotes a B-bit quantizer.

The two sequences $\{b_R[n]\}_{n=1}^{P}$ and $\{b_I[n]\}_{n=1}^{P}$ constitute a digital representation of the M×Q non-zero coefficients and the Q delays of the estimated downlink channels, as estimated by the MS 16. Next, the MS 16 transmits the 2×P×B bits to the network 10 using the digital reverse link.

At the network 10, for example at the supporting BS 12, these 2×P×B bits are detected (for example, using a RAKE receiver if direct spread CDMA is used on the reverse link). The detected versions of the received $b_R[n]$ at the network 10 are denoted as $\hat{b}_R[n]$ and the detected versions of the $b_I[n]$ are denoted as $\hat{b}_R[n]$. Given knowledge of the sequences $p_m[n]$'s at the network 10, the network 10 can estimate $\hat{g}_m[n]$ from $\hat{b}_R[n]$ and $\hat{b}_I[n]$.

Thus, one can define:

$$\hat{s}[n] = \hat{b}_R[n] + j\hat{b}_I[n] \quad n = 1, \ldots, P, \tag{14}$$

and denote estimated values of $\hat{g}_m[n]$, formed at the network 10, by $\tilde{g}_m[n]$. To compute the set of $\{\tilde{g}_m[n]\}_{m=1}^{M}$ from the $\hat{s}[n]$'s, the network 10 models the $\hat{s}[n]$'s according to:

$$\tilde{s}[n] = \sum_{m=1}^{M} \tilde{g}_m[n] * p_m[n] \quad n = 1, \ldots, P, \tag{15}$$

where, $$\tilde{g}_m[n] = \sum_{k=1}^{Q} \tilde{a}_{m,k} \delta[n - \tilde{n}_k]. \tag{16}$$

In Eq. 16 above, one sees that the estimated impulse responses $\tilde{g}_m[n]$ are a function of the network's estimates of the mobile-estimated downlink coefficients $\tilde{a}_{m,k}$ and its estimates of the corresponding mobile-estimated delays $\tilde{n}_k$. Thus, the network may form $\tilde{g}_m[n]$ as the solution to the following optimization problem:

$$\operatorname*{argmin}\sum_{n=1}^{P} |\hat{s}[n] - \tilde{s}[n]|^2, \tag{17}$$

where the optimization in Eq. 17 is a joint optimization over the $\tilde{a}_{m,k}$'s and the $\tilde{n}_k$'s, which in turn define $\{\tilde{g}_m[n]\}_{m=1}^{M}$ according to Eq. 16. Where the mobile-estimated delays are known to the network 10, the network has values for the $\tilde{n}_k$'s and the optimization over just the $\tilde{a}_{m,k}$'s becomes a simple linear-least-squares problem. Of course, those skilled in the art will recognize other approaches to such optimization problems.

With the MS's downlink channel estimates determined at the network 10, the network 10 may use those determined estimates to configure transmit pre-compensation. For example, the network 10 may form the complex conjugates of the estimated channel impulse responses, and use these conjugate values to configure the transmit pre-filters 88 as are shown, for example in FIG. 10A. Of course, other transmit pre-compensation schemes might employ the determined downlink channel coefficients, and the above exemplary procedure for determining the mobile-estimated downlink channel estimates at the network 10 outlined above is not limited to the particular filtering configurations depicted in the various illustrations.

Figure 17:
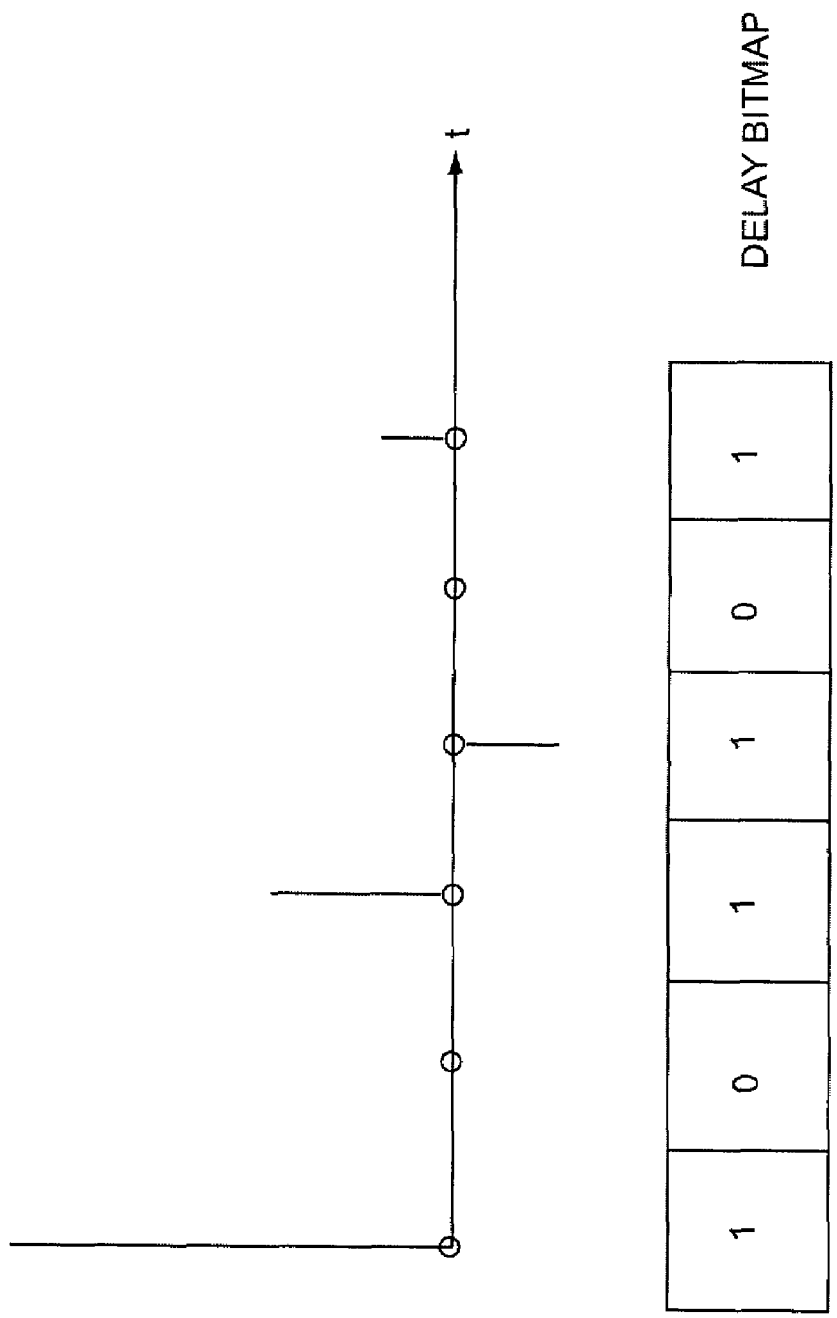
FIG. 17 is a diagram of an exemplary propagation path delay bitmap.

Regardless of the particular use of the obtained downlink channel information, the MS 16 may separately report the estimated downlink path delays to the network 10, which, in some respects, can simplify the network's optimization-based approach to determining the mobile-estimated downlink channel coefficients. FIG. 17 illustrates an exemplary approach to representing downlink channel path delays by a simple bit map on a grid with spacing $T_s$.

More specifically, defines $\hat{s}[n] = \hat{b}_R[n] + j\hat{b}_I[n]$, and further define an associated vector of size P×1 as, $$\hat{\mathbf{s}} = [\hat{s}[1], \hat{s}[2], \ldots, \hat{s}[P]]^T \tag{18}$$

Similarly, a composite vector of all the non-zero channel coefficients is defined as:

$$\tilde{\mathbf{a}} = [\tilde{a}_{11}, \ldots, \tilde{a}_{1Q}; \tilde{a}_{21}, \ldots, \tilde{a}_{2Q}; \ldots; \tilde{a}_{M1}, \ldots, \tilde{a}_{MQ}], \tag{19}$$

which has dimension (M×Q). With the above, Eq. 15 may be expressed in matrix notation as, $$\tilde{\mathbf{s}} = R\tilde{\mathbf{a}}, \tag{20}$$

where R is a convolution matrix with P rows and (M×Q) columns whose entries only depend on the sequences $p_m[n]$'s and the known delays $\tilde{n}_k$'s, and where $\tilde{\mathbf{s}} = [\tilde{s}[1], \tilde{s}[2], \ldots, \tilde{s}[P]]^T$.

At the network 10, the final estimate of the non-zero coefficients of the downlink channels (i.e., the solution to the optimization of Eq. 17) may then be formed according to:

$$\tilde{\mathbf{a}} = \underline{(R^T R)^{-1} R \hat{\mathbf{s}}}. \tag{21}$$
$$\phantom{\tilde{\mathbf{a}} = }\overline{R}$$

The above channel state information generally is developed for a plurality of MSs 16, all providing downlink channel state information to the network 10. As was alluded to earlier, the CFC defined for a given network area or sector may be shared in TDMA fashion by a plurality of MSs 16, such that each MS 16 uses the CFC for allocated periods or as otherwise commanded by the network to return downlink channel state information to the network 10. In at least some exemplary embodiments, the network 10 schedules usage of the CFC by the MSs 16 "on-the-fly." In at least some embodiments, such CFC scheduling is driven by the downlink scheduling performed by the network 10.

In some types of wireless networks, a given plurality of MSs 16 simultaneously receive downlink traffic on a given channel (e.g., assigned frequency). In other network architectures, individual ones in a group of MSs 16 share a common downlink channel, which is assigned in TDMA fashion to selected ones of the MSs 16. That is, a single downlink traffic channel from network 10 to a defined group of MSs 16 is divided into timeslots and, generally, only one of the MSs 16 in the group receives downlink traffic in any given timeslot. The High Data Rate (HDR) extensions of IS-2000, described in TIA/EIA/IS-856 standard, and the High Speed Downlink Packet Access (HSDPA) mode of WCDMA are examples of such shared downlink traffic channels. Where the network 10 uses shared downlink traffic channels, the network 10 schedules which MSs 16 receives data on which downlink timeslot.

Prior to transmitting data to a particular MS 16 on the downlink channel, the network 10 requests that the particular MS 16 transmit loop-back information (i.e., requests that it feed back bit sequences $b_R[n]$ and $b_I[n]$ on the CFC), or other designated uplink channel. The CFC may be divided into timeslots, with the network 10 requesting particular ones of the MSs 16 to transmit loop-back information at particular times on the CFC. It should be understood that the network 10 might define multiple CFCs corresponding to different service areas, and thereby received loop-back information for different pluralities of MSs 16 on each of the CFCs. Such arrangements might use a common transmit processing system 18 and associated network transmitters 42, or might use different such entities to support the different groups of MSs 16.

In configuring the CFC as a TDMA-based channel for cooperative sharing between two or more MSs 16, one generally must define the duration of CFC timeslots and the power at which each MS 16 transmits on the CFC. In an exemplary embodiment, timeslot configuration of the CFC may be made consistent with the particular air interface(s) used by the network 10. For example, if network 10 is based on WCDMA standards, the basic 0.66 millisecond timeslot of WCDMA may be adopted for the CFC. Similarly, received signal quality measures defined for other traffic channels may be used as a reference for setting CFC transmit power. Thus, in an exemplary embodiment, MS transmit power for CFC transmissions is set such that approximately the same SNR is achieved at the BS 12 for received CFC transmissions as for the uplink voice channels. In a WCDMA implementation, and assuming two receive antennas at the BS 12 and assuming a flat uplink channel, the power transmitted by each MS 16 associated with a given CFC is controlled so that an SNR of −16 dB is maintained at the network's receiver.

As an exemplary scenario, consider a WCDMA implementation for network 10, wherein a given BS 12 employs four (4) transmit antennas (M=4), and the MSs 16 use a single receive antenna. The downlink channel from each network transmit antenna to each MS 16 is modeled as a CASE-3 channel (i.e., each downlink channel has 4 independently fading, chip-spaced rays with strengths 0, −3, −6, and −9 dB). Further, assume that a pilot signal is transmitted on each network transmit antenna at the BS 12, and 25% of the total power transmitted from the BS is devoted to these pilot signals. Further assumptions supporting simulation analysis of the mobile-estimated include modeling the reverse link from the MSs 16 to the BS 12 as a flat channel, and that reverse link power control maintains the received SNR at the BS 12 for the CFC at the target level, e.g., −16 dB for a WCDMA implementation. Further assumptions are that each time slot on the CFC is 0.66 millisecond long, direct sequence CDMA with spreading factor 16 is used on the CFC, the MSs 16 use Binary Phase Shift Keying (BPSK) modulation on the CFC reverse link, and that 160 feedback bits are transmitted in one timeslot of the CFC (i.e., the quantizer for converting $s_R[n]$ and $s_I[n]$ to $b_R[n]$ and $b_I[n]$, respectively, is a one-bit quantizer: $b_R[n]=\text{sign}(s_R[n])$ and $b_I[n]=\text{sign}(s_I[n])$).

The MSs 16 transmit loop-back information on assigned timeslots on the CFC. Assuming that both the MSs 16 and the network 10 know the delays of the downlink channels, the MSs 16 need only estimate the channel coefficients of the downlink channel(s) associated with each of the network transmit antennas. As an example, where M=4, there are a total of 16 complex-valued coefficients for the 4 downlink channels for each MS 16. These estimated channel coefficients are fed back to the network 10 from each MS 16 using the 2×P×B bit sequencing approach to the mobile-estimated loop-back method outlined above, where B=1. That is, each MS 16 informs the network 10 of the downlink channel state coefficients based on the transmitting loop-back information in the form of the $\{b_R[n], b_I[n]\}_{n=1}^P$ bit sequences defined above.

The network 10 detects these transmitted bits where the power transmitted by each MS 16 on the CFC is controlled so that the SNR at BS 12 is maintained substantially at the target value. From the detected bits for each MS 16, the network 10 generates an estimate of the downlink channel coefficients seen by each MS 16. These estimated downlink channel coefficients are then used by the network 10 to create a bank of matched filters. In an exemplary embodiment, one matched filter is created for each of the M network transmit antennas 46 at BS 12. The bank of matched filters might, in some embodiments, be implemented in transmit processing system 18, as in the pre-filters 88 shown in FIG. 10A for example. However, as was noted earlier, other filtering configurations might use the mobile-estimated downlink channel information.

Thus, in other embodiments, the bank of matched filters might be implemented in signal processing resources directly in the BS 12. Indeed, this latter possibility illustrates the inherent flexibility regarding implementation of transmit signal pre-compensation in the context of the present invention. That is, the transmit signal pre-compensation may be consolidated in transmit processing system 18 for example, or some or all of the functionality of that entity may be distributed across various elements within network 10.

In any case, implementation of the above matched filters essentially creates a new single-input/single-output (SISO) channel between the BS 12 and each of the involved MSs 16. With perfect knowledge of the downlink channels available to the network 10, this SISO channel results in a certain data rate that can be reliably transmitted to the MS 16 from the BS 12. Of course, since the network 10 develops estimates of the downlink channels based on the loop-back information comprising, in this embodiment, mobile-estimated downlink channel state information, returned by the MSs 16, its knowledge of the downlink channel(s) is something less than perfect.

To quantify the impact of the network 10 using estimated channel values for transmit signal pre-compensation, one may examine the SNR needed to obtain 1% block error rate (BLER) at various information data rates. With higher the information data rates, a higher SNR is needed to achieve the desired 1% BLER at the MSs 16. In this context, SNR is defined as the total power transmitted from all the transmit antennas at the BS 12 divided by the power of the thermal noise at the MSs' receivers (where such noise is band limited by the receiver filtering).

For a WCDMA system with a 1-bit quantizer (B=1), and with the above assumptions and definitions, it was determined from simulations that the SNR needed to achieve a certain data rate with mobile-estimated downlink channel information is within 1 dB of the SNR needed to achieve the same data rate with perfect downlink channel knowledge at the network 10. Furthermore, approximately 10 dB less SNR is required to achieve a data rate of 5 Megabits/sec where the network 10 uses transmit signal pre-compensation and four (4) transmit antennas versus using only one transmit antenna at the BS 12.

Of course, the mobile-estimated approach represents only one of a number of exemplary embodiments described herein. More generally, the present invention discloses various approaches to loop-back signal generation at one or more MSs 16, and subsequent transmit signal pre-compensation by the network 10 supporting communication with those MSs 16 based on downlink channel information obtained from processing the loop-back signals at the network 10. As was discussed, a MS 16 may form such the loop-back signal by linearly combining samples of its composite received signal with locally generated pilot and/or data samples, or may form the loop-back signal based on time-multiplexing received signal samples with locally generated samples (pilot and/or data), or may send loop-back information on a different code channel or frequency.

The combination of such loop-back and locally generated samples in the loop-back signal permits the network 10 to strip out the effects of the uplink channel, leaving it able to determine the downlink channel characteristics, which determination provides the network 10 its basis for pre-compensating its transmit signals for the downlink. As was noted, such pre-compensation may be performed at the information symbol rate, as where the network 10 determines cross-coupling between the combined information streams it transmits, and pre-compensates the individual streams for such downlink-channel induced cross-correlations. Alternatively, or additionally, the network 10 performs pre-compensation at the transmission modulation rate, e.g., chip rate processing, in which case it adjusts the coefficients in its transmit pre-filters based on its estimated downlink channel characteristics.

While symbol-rate pre-compensation processing is useful for improving performance reception at the MSs 16, transmit-rate pre-compensation processing is useful for improving transmission efficiencies. Thus, the two approaches may be combined to obtain both benefits. Transmit-rate pre-compensation processing generally requires MSs 16 to loop back samples essentially taken directly from their received signals, symbol-rate processing generally requires them to loop-back processed received signal samples (e.g., de-spread soft symbol values). In an exemplary approach to combined pre-compensation processing, the MSs 16 loop back received signal samples, and the network 10 estimates the processed samples that would have been obtained by the MSs 16, based on modeling their receiver processes.

Still other exemplary embodiments shift, at least to some extent, downlink channel state estimation to the MSs 16, such that the loop-back signal is formed as a special sequence of bits from which convey channel estimation information to the network 10. With this approach, the network 10 uses the mobile-estimate downlink information obtained from the MSs 16 to configure its transmit signal pre-filtering as a set of matched filters intended to compensate for the expected effects of the downlink channels between it and the MSs 16.

Those skilled in the art will appreciate that the scope and complexity of the present invention prevent discussion of all possible variations and refinements. Thus, the above discussion represents a presentation of selected, exemplary embodiments that, while sufficient for understanding and practicing the present invention as claimed, are not limiting. Indeed, the present invention is limited only by the scope of the following claims and the reasonable equivalents thereof.

What is claimed is:

1. A wireless communication network comprising:
   a network transmitter transmitting a combined transmit signal that includes individual information signals intended for one or more mobile stations;
   a network receiver receiving loop-back signals from the one or more mobile stations; and
   a transmit processor pre-compensating the combined transmit signal by compensating the individual information signals for estimated cross-correlation interference at the one or more mobile stations, such that unwanted signal interference is reduced at each mobile station, the transmit processor comprising:
   memory to retain transmit information corresponding to the combined transmit signal;
   a first processing system compensating for the individual information signals by passing the individual information signals through a first interference cancellation matrix that is based on estimated transmit channel characteristics; and
   a second processing system generating the estimated transmit channel characteristics based on comparing the loop-back signals with the retained transmit information.

2. The wireless communication network of claim 1, wherein the network transmitter comprises one of a plurality of network transmitters, each network transmitter transmitting a different combined transmit signal to the one or more mobile stations.

3. The wireless communication network of claim 2, wherein the transmit processor forms the different combined transmit signals based on processing the individual information signals using the estimated transmit channel characteristics, and wherein the estimated transmit channel characteristics include downlink propagation path estimates for the plurality of network transmitters relative to the one or more mobile stations.

4. The wireless communication network of claim 3, wherein processing the individual information signals comprises processing the individual information signals with time-reverse-conjugate channel impulse responses obtained from the downlink propagation path estimates.

5. The wireless communication network of claim 4, wherein processing the individual information signals with time-reverse-conjugate channel impulse responses obtained from the downlink propagation path estimates comprises forming the combined transmit symbols as weighted combinations of the individual information signals based on a pre-compensation combining matrix formed from the time-reverse-conjugate channel impulse responses.

6. The wireless communication network of claim 1, wherein the second processing system compares the loop-back signals with the retained transmit information by:
   generating estimated loop-back samples representative of loop-back signal samples generated at the one or more mobile stations; and
   correlating the estimated loop-back samples with actual loop-back samples received in the loop-back signals after removal of uplink channel effects.

7. The wireless communication network of claim 6, wherein the second processing system generates the estimated loop-back samples by passing transmit signal samples obtained from the retained transmit information through an estimated uplink channel.

8. The wireless communication network of claim 1, wherein the second processing system:
   generates reference signals by processing the loop-back signals with estimated loop-back channel characteristics; and
   correlates the reference signals with the loop-back signals to determine the estimated transmit channel characteristics.

9. The wireless communication network of claim 8, wherein the transmit processor determines the estimated loop-back channel characteristics based on correlating selected samples in the loop-back signals with corresponding sample values known a priori to the network.

10. The wireless communication network of claim 9, wherein the selected samples in the loop-back signals comprise pilot information samples, and wherein the corresponding sample values comprise pilot information stored at the network.

11. The wireless communication network of claim 1, wherein the first interference cancellation matrix comprises an inverse cross-correlation matrix determined from the estimated transmit channel characteristics.

12. The wireless communication network of claim 1, wherein the transmit processor pre-compensates the combined transmit signal by passing combinations of the individual information signals through one or more transmit pre-filters having filter coefficients determined from the estimated transmit channel characteristics.

13. The wireless communication network of claim 1, wherein the loop-back signals comprise loop-back samples of composite received signals as received by individual ones of the mobile stations, and wherein the retained transmit information comprises retained samples of the combined transmit signal.

14. The wireless communication network of claim 13, wherein comparing the loop-back signals with the retained transmit information comprises:
  generating reference signal samples based on passing the retained samples of the combined transmit signal through an estimated uplink channel; and
  correlating the reference signal samples with corresponding samples in the loop-back signals.

15. The wireless communication network of claim 14, wherein the transmit processor obtains transmit rate compensation information from the correlations between the reference signal samples and the corresponding samples in the loop-back signals for pre-compensating the combined transmit signal.

16. The wireless communication network of claim 13, wherein the network further retains information symbols from the individual information signals as part of the retained transmit information.

17. The wireless communication network of claim 16, further comprising deriving receiver output samples from the loop-back signals representative of receiver-processed samples that would be obtained from the combined transmit signal at the one or more mobile stations based on modeling mobile station receiver processing.

18. The wireless communication network of claim 17, wherein the transmit processor obtains information symbol rate compensation information by correlating the derived receiver output samples and corresponding ones of the information symbols in the retained transmit information.

19. A method of transmit signal pre-compensation at a wireless communication network, the method comprising:
  retaining transmit information associated with a combined transmit signal transmitted from the network to one or more mobile stations, wherein the combined transmit signal is formed from one or more individual information signals intended for different ones of the mobile stations, and wherein the transmit information associated with the combined transmit signal comprises the individual information signals used to form the combined transmit signal;
  receiving loop-back signals from the mobile stations, wherein the loop-back signals comprise mobile station receiver output values;
  determining one or more estimated transmit channel characteristics based on comparing the retained transmit information with loop-back information obtained from the loop-back signals;
  generating cross-correlation compensation values based on correlating the mobile station receiver output values obtained from the loop-back signals with corresponding information symbols in the retained individual information signals; and
  performing pre-compensation processing for the combined transmit signal based on the estimated transmit channel characteristics and compensating the individual information signals used to form the combined transmit signal with the cross correlation compensation values.

20. The method of claim 19, wherein the loop-back signals comprise looped-back samples of composite received signals received at individual ones of the mobile stations.

21. The method of claim 20, wherein retaining transmit information associated with a combined transmit signal transmitted from the network to one or more mobile stations comprises retaining samples of the combined transmit signal.

22. The method of claim 21, wherein determining one or more estimated transmit channel characteristics based on comparing the retained transmit information with loop-back information obtained from the loop-back signals comprises:
  generating reference samples based on passing the retained samples of the combined transmit signal through an estimated uplink channel; and
  correlating the reference samples with corresponding loop-back samples from the loop-back signals.

23. The method of claim 20, further comprising deriving receiver output samples from the loop-back signals representative of receiver-processed samples that would be obtained from the composite received signals at the one or more mobile stations based on modeling mobile station receiver processing.

24. The method of claim 23, further comprising retaining the individual information signals as part of the retained transmit information.

25. The method of claim 24, further comprising:
  determining cross-correlations between the individual information signals based on correlating the derived receiver output signals with corresponding ones of the retained individual information signals; and
  generating cross-correlation compensation values from the determined cross-correlations for pre-compensating the individual information signals used to form the combined transmit signal.

26. The method of claim 19, wherein compensating the individual information signals used to form the combined transmit signal with the cross correlation compensation values comprises passing the individual information signals through an interference cancellation matrix having matrix coefficients based on the cross-correlation compensation values.

27. A method of providing loop-back information to a wireless communication network, the method comprising:
  receiving a composite spread spectrum signal transmitted by the network at a mobile station, the composite spread spectrum signal including a plurality of differently spread individual information signals intended for different ones of a plurality of mobile stations;
  processing the composite signal to recover mobile-specific signal samples by:
    despreading the composite spread spectrum signal to recover the individual information signal intended for the mobile station; and
    demodulating soft symbol values from the individual information signal as the mobile specific signal samples; and
  transmitting at least some of the mobile-specific signal samples back to the network as a loop-back signal.

28. The method of claim 27, wherein receiving a composite signal transmitted by the network at a mobile station comprises receiving one or more combined transmit signals comprising a combination of individual information signals intended for different ones of a plurality of mobile stations.

29. The method of claim 27, wherein transmitting at least some of the mobile-specific signal samples back to the network as a loop-back signal comprises transmitting selected mobile-specific samples together with locally-generated signal samples, such that the loop-back signal includes both mobile-specific sample and locally-generated signal information.

30. The method of claim 29, wherein transmitting selected mobile-specific samples together with locally-generated signal samples comprises alternating between transmitting the locally-generated signal samples and the mobile-specific samples.

31. The method of claim 29, wherein transmitting selected mobile-specific samples together with locally-generated signal samples comprises linearly combining the mobile-specific samples and the locally-generated signal samples.

32. The method of claim 29, wherein transmitting selected mobile-specific samples together with locally-generated signal samples comprises linearly combining the mobile-specific samples and the locally-generated signal samples using a desired time offset between the mobile-specific samples and the locally-generated samples.

33. The method of claim 29, wherein the locally generated samples comprise pilot signal samples known to the network.

34. The method of claim 29, wherein the locally generated samples comprise uplink traffic samples.

35. The method of claim 29, wherein the locally generated samples comprise a combination of pilot signal samples and uplink traffic samples.

36. A method of pre-compensating a transmit signal transmitted to one or more mobile stations by a wireless communication network, the method comprising:
receiving a plurality of loop-back signals from the plurality of mobile stations comprising loop-back samples of the transmit signal as received by the mobile stations;
retaining samples of individual information signals intended for different ones of the plurality of mobile stations, including a mobile station from which a loop-back signal is received, wherein one or more of the individual information signals are included in the transmit signal;
removing uplink channel effects from the plurality of loop-back signals;
generating estimated output samples that would be obtained at the receivers of the plurality of mobile stations based on processing the loop-back signals at the network using one or more mobile station receiver models;
determining interference between the plurality of individual information signals based on cross-correlating the retained samples for the individual information signals with the estimated output samples; and
compensating the individual information signals to reduce the determined interference.

37. The method of claim 36, wherein the network includes receiver models for each of the plurality of mobile stations.

38. The method of claim 36, wherein the network includes a database of receiver models, and further comprising:
receiving receiver model information from the mobile stations; and
selecting one of the receiver models to use for each mobile station based on receiver model information received from that mobile station.

39. The method of claim 38, further comprising interrogating mobile stations for the receiver model information.

40. The method of claim 36 further comprising retaining transmit signal samples at the network.

41. The method of claim 40, further comprising processing the loop-back signal after removal of the uplink channel effects to determine downlink channel characteristics.

42. The method of claim 41, further comprising compensating the transmit signal for the downlink channel characteristics based the determined downlink channel characteristics.

* * * * *